(12) United States Patent
Kim et al.

(10) Patent No.: US 9,813,532 B2
(45) Date of Patent: Nov. 7, 2017

(54) ANTENNA AND ELECTRONIC DEVICE INCLUDING THE SAME

(71) Applicant: Samsung Electronics Co., Ltd., Gyeonggi-do (KR)

(72) Inventors: Kyoung Mok Kim, Gyeonggi-do (KR); Young Jun Kim, Gwangju (KR); Yoon Jung Kim, Daejeon (KR); Sang Bong Sung, Gyeonggi-do (KR); Shin Ho Yoon, Jeju-do (KR); Jin Young Jeong, Daejeon (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/438,362

(22) Filed: Feb. 21, 2017

(65) Prior Publication Data

US 2017/0244818 A1 Aug. 24, 2017

(30) Foreign Application Priority Data

Feb. 20, 2016 (KR) ........................ 10-2016-0020120

(51) Int. Cl.
*H04M 1/02* (2006.01)
*H01Q 21/30* (2006.01)
*H01Q 1/24* (2006.01)
*H01Q 7/00* (2006.01)

(52) U.S. Cl.
CPC ......... *H04M 1/026* (2013.01); *H04M 1/0277* (2013.01)

(58) Field of Classification Search
CPC .... H04M 1/026; H04M 1/0277; H01Q 1/243; H01Q 1/48; H01Q 7/005; H01Q 9/0442; H01Q 9/145; H01Q 13/103; H01Q 9/0421; H01Q 5/35; H04B 1/40
See application file for complete search history.

(56) References Cited

U.S. PATENT DOCUMENTS 7,250,910 B2 * 7/2007 Yoshikawa .............. H01Q 1/24
343/702
7,439,911 B2 * 10/2008 Wang ....................... H01Q 9/42
343/700 MS (Continued)

OTHER PUBLICATIONS

International Search Report dated Jun. 8, 2017 issued in counterpart application No. PCT/KR2017/001863, 13 pages.

*Primary Examiner* — Pablo Tran
(74) *Attorney, Agent, or Firm* — The Farrell Law Firm, P.C.

(57) ABSTRACT

An electronic device is provided. The electronic device includes a housing including a first metallic member, a second metallic member, and a nonconductive segmenting part located between an end of the first metallic member and an end of the second metallic member, a ground member, a wireless communication circuit connected to a first point of the first metallic member through a first electrical path and connected to a second point of the first metallic member through a second electrical path, a first conductive pattern electrically connected to the first electrical path, a second conductive pattern electrically connected to the second electrical path, a first electrical variable element electrically connected between the first electrical path and the ground member, and a second electrical variable element electrically connected between the second metallic member and the ground member.

20 Claims, 30 Drawing Sheets

(56) References Cited

U.S. PATENT DOCUMENTS

| | | | |
|---|---|---|---|
| 7,595,759 B2* | 9/2009 | Schlub | H01Q 1/243 343/700 MS |
| 8,270,914 B2 | 9/2012 | Pascolini et al. | |
| 8,615,279 B2 | 12/2013 | Wong et al. | |
| 8,774,880 B2 | 7/2014 | Wong et al. | |
| 9,203,463 B2 | 12/2015 | Asrani et al. | |
| 9,300,045 B2* | 3/2016 | Wong | H01Q 5/50 |
| 9,577,318 B2* | 2/2017 | Pascolini | G06K 9/00006 |
| 9,583,838 B2* | 2/2017 | Zhu | H01Q 13/10 |
| 2010/0238079 A1* | 9/2010 | Ayatollahi | H01Q 1/243 343/729 |
| 2010/0279734 A1* | 11/2010 | Karkinen | H01Q 3/24 455/554.2 |
| 2010/0295737 A1* | 11/2010 | Milosavljevic | H01Q 1/24 343/702 |
| 2011/0136447 A1 | 6/2011 | Pascolini et al. | |
| 2012/0009983 A1 | 1/2012 | Mow et al. | |
| 2012/0019418 A1 | 1/2012 | Wong et al. | |
| 2012/0021701 A1 | 1/2012 | Wong et al. | |
| 2012/0229347 A1* | 9/2012 | Jin | H01Q 1/243 343/702 |
| 2012/0231750 A1* | 9/2012 | Jin | H01Q 7/005 455/77 |
| 2012/0299785 A1* | 11/2012 | Bevelacqua | H01Q 9/42 343/702 |
| 2013/0009828 A1 | 1/2013 | Pascolini et al. | |
| 2013/0102357 A1* | 4/2013 | Vance | H01Q 1/243 455/550.1 |
| 2013/0203364 A1 | 8/2013 | Darnell et al. | |
| 2014/0015719 A1 | 1/2014 | Ramachandran | |
| 2015/0099993 A1 | 4/2015 | Weaver et al. | |
| 2015/0171916 A1 | 6/2015 | Asrani et al. | |
| 2016/0050302 A1 | 2/2016 | Lee et al. | |

\* cited by examiner

| a | 2.2nH |
|---|---|
| b | 100pF |
| c | 1.2pF |
| d | 100pF |
| e | 1.2nH |
| f | 15nH |
| i | 8.2nH |
| j | 2.7nH |
| k | 12nH |
| l | 0 ohm |
| m | 5.6nH |

| CLASSIFICATION | 1140 | 1180 | 1150 |
|---|---|---|---|
| LTE Band5 | b | Open | - |
| LTE Band8 | a | Open | 1151,1154:off<br>1152,1153:on<br>1156:2.37pF<br>1158:0.5pF } 1150 setting |
| LTE Band3 | c | Open | - |
| LTE Band1 | Open | m | - |
| LTE Band7 | Open | l | - |
| LTE Band17 | b | Open | - |
| WCDM42 | c | m | - |

| Band | LTE B17 | LTE B5 | LTE B8 | LTE B3 | LTE B2 | LTE B1 | LTE B7 |
|---|---|---|---|---|---|---|---|
| Mhz | 704~746 | 824~894 | 880~960 | 1710~1880 | 1850~1990 | 1920~2170 | 2500~2690 |
| ANT1 | Tx, Rx | Tx, Rx | Tx, Rx | Rx | Rx | Rx | Rx |
|  | 1140:b | 1140:b | 1140:a | 1140:c | 1140:c | 1140:Open | 1140:Open |
|  | 1180:Open | 1180:Open | 1180:Open + 1150 on | 1180:Open | 1180:open | 1180:m | 1180:l |
| ANT2 |  |  |  | Tx, Rx | Tx, Rx | Tx, Rx | Tx, Rx |
|  |  |  |  | 1140:c | 1140:c | 1140:Open | 1140:Open |
|  |  |  |  | 1180:Open | 1180:open | 1180:m | 1180:l |

FIG. 12

ANTENNA AND ELECTRONIC DEVICE INCLUDING THE SAME

PRIORITY

This application claims priority under 35 U.S.C. §119(a) to Korean Patent Application Serial number 10-2016-0020120, which was filed on Feb. 20, 2016 in the Korean Intellectual Property Office, the entire disclosure of which is incorporated herein by reference.

BACKGROUND

1. Field of the Disclosure

The present disclosure relates generally to an electronic device, and more particularly, to an electronic device including the antenna.

2. Description of the Related Art

Due to the recent development of the information/communication technology, network devices such as base stations have been installed all over Korea. Electronic devices are communicatively coupled with the base station thereby allowing the user of the electronic device to transmit and receive data to and from another device through the networks.

In order for the electronic devices to communicate over the network, one or more antenna configurations are provided in the electronic device.

SUMMARY

Aspects of the present disclosure have been made to address at least the above-mentioned problems and/or disadvantages and to provide at least the advantages described below. Accordingly, an aspect of the present disclosure is to provide an antenna that may provide superior performance and may be easily secured in a mounting space of an electronic device.

Another aspect of the present disclosure is to provide an electronic device including a coupled feeding antenna that connects a metallic housing and a feeder to a capacitor.

Another aspect of the present disclosure is to provide an electronic device in which feeders of a first antenna and a second antenna, which use at least a portion of a metallic housing of the electronic device, are connected to one metallic member.

In accordance with an aspect of the present disclosure, there is provided an electronic device. The electronic device includes a housing including a first metallic member, a second metallic member, and a nonconductive segmenting part located between an end of the first metallic member and an end of the second metallic member, a ground member, a wireless communication circuit connected to a first point of the first metallic member through a first electrical path and connected to a second point of the first metallic member through a second electrical path, a first conductive pattern electrically connected to the first electrical path, a second conductive pattern electrically connected to the second electrical path, a first electrical variable element electrically connected between the first electrical path and the ground member, and a second electrical variable element electrically connected between the second metallic member and the ground member.

In accordance with an aspect of the present disclosure, there is provided an electronic device. The electronic device includes a housing including a first conductive part including a first end, a second conductive part including a second end proximate to the first end, and a nonconductive part inserted between the first end and the second end, a ground member, a wireless communication circuit electrically connected to a first point of the elongated conductive part through a first electrical path and to a second point of the first conductive part through a second electrical path, a first conductive pattern electrically connected to the first electrical path, a second conductive pattern electrically connected to the second electrical path, a first electrical variable element electrically connected between the first electrical path and the ground member, and a second electrical variable element electrically connected between the second conductive part and the ground member.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 12 is a table illustrating communication operations of a first antenna and a second antenna of an electronic device, according to an embodiment of the present disclosure;

Throughout the drawings, it should be noted that like reference numbers are used to depict the same or similar elements, features, and structures.

DETAILED DESCRIPTION

Figure 1:
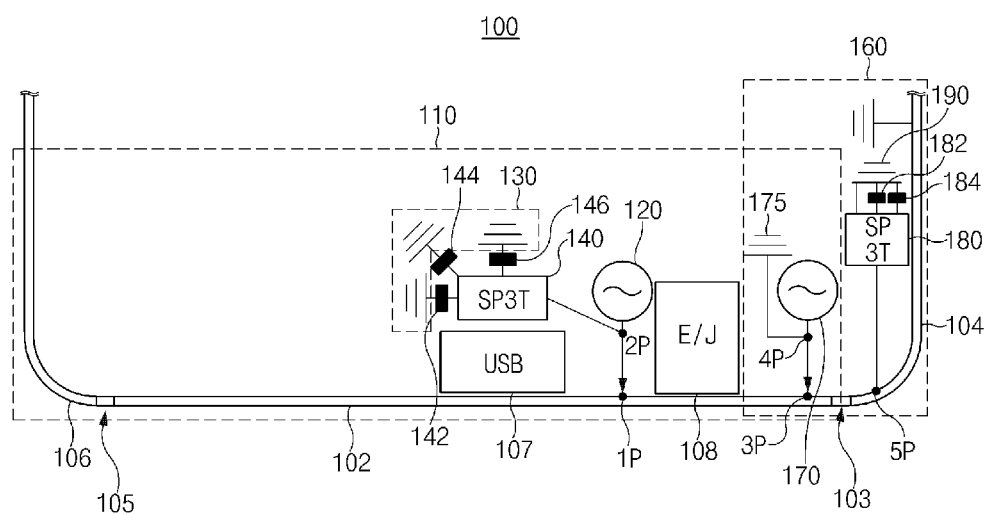
FIG. 1 is a diagram of a part of an antenna structure which uses a conductive housing of an electronic device, to which a feeder is connected, and in which ground members are connected to a metallic member and another metallic member, respectively, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a diagram of a part of an antenna structure which uses a conductive housing of an electronic device, to which a feeder is connected, and in which ground members are connected to a metallic member and another metallic member, respectively, according to an embodiment of the present disclosure.

FIG. 1 illustrates an interior of a lower end of an electronic device 100. The electronic device 100 may include a side housing including a first metallic member 102, a second metallic member 104, a third metallic member 106, a first segmenting part 103 between an end of the first metallic member 102 and an end of the second metallic member 104, and a second segmenting part 105 between an end of the first metallic member 102 and an end of the third metallic member 106. For example, the electronic device 100 may include a housing including a first surface (e.g., the direction of a display panel of the electronic device 100), a second surface (e.g., the direction of a battery cover of the electronic device 100) facing an opposite direction of the first surface, and a side surface surrounding at least a portion of a space between the first surface and the second surface. A printed circuit board (PCB), on which at least one electronic component is mounted, a flexible printed circuit board (FPCB), and/or a battery may be disposed in the interior of the housing.

The electronic device 100 may include a first antenna 110 and a second antenna 160. The first antenna 110 may include a feeder 120, a ground member 130, and an electrical variable element 140. The first antenna 110 may use at least a portion of the first metallic member 102 and the third metallic member 106 as a conductive pattern. The second antenna 160 may include a feeder 170, a first ground member 175, an electrical variable element 180, and a second ground member 190. The second antenna 160 may use at least a portion of the first metallic member 102 and the second metallic member 104 as a conductive pattern.

The electrical variable element 140 and/or the electrical variable element 180 may include a switch (for example, SP2T or SP3T) and a plurality of electrically different components (e.g., an inductor, a capacitor, and a resistor).

The feeder 120 of the first antenna 110 may be connected to one point 1p of the first metallic member 102 between a first structure 107 (e.g., a USB connection terminal) and a second structure 108 (e.g., an earphone connection terminal). The ground member 130 of the first antenna 110 may be connected to one point 2p of a first electrical path that connects the feeder 120 and the first metallic member 102. Point 2p may be closer to an end of the first metallic member 102 that is adjacent to the first segmenting part 103 than point 1p.

The feeder 120 of the first antenna 110 and the feeder 170 of the second antenna 160 may be connected to the first metallic member 102 while the first structure 108 (e.g., an earphone connection terminal) is interposed between the feeders 120 and 170. The feeder 170 of the second antenna 160 may be connected to one point 3p of the first metallic member 102. The first ground member 175 of the second antenna 160 may be connected to one point 4p of a second electrical path that connects the feeder 170 and the first metallic member 102. The second ground member 190 of the second antenna 160 and the electrical variable element 180 may be connected to one point 5p of the third metallic member 106.

Because a mounting space is not large enough to allow the first ground member 175 of the second antenna 160 to be connected to the second metallic member 104 and the number of the flanges of the first metallic member 102 is not large enough to allow the first ground member 175 of the second antenna 160 to be directly connected to the first metallic member 102, the first ground member 175 may be connected to the first metallic member 102 through the second electrical path.

A communication circuit and/or a processor (e.g., a communication processor (CP)) may control the electrical variable element 140 and the electrical variable element 180. At least one of the communication circuit and/or the processor may control the electrical variable element 140 to connect the ground member 130 to the first metallic member 102 through one of a first device 142, a second device 144, and a third device 146 of the first antenna 110. At least one of the communication circuit and/or the processor may control the electrical variable element 180 to connect the second ground member 190 to the second metallic member 104 through one of a first device 182 and a second device 184 of the second antenna 160. When the electrical variable element 180 includes an SP3T switch, one of the three connectors of the SP3T may be connected to the first device 182, a second one of the SP3T may be connected to the second device 182, and the remaining one of the SP3T may not be connected to any device. Accordingly, at least one of the communication circuit and/or the processor may control the electrical variable element 180 such that neither of the first device 182 and the second device 184 is connected. Through the device selecting operation, the communication circuit may adjust the resonance frequencies of the first antenna 110 and the second antenna 160. Each of the devices may be one of a resistor, a capacitance, and an inductor.

Figure 2:
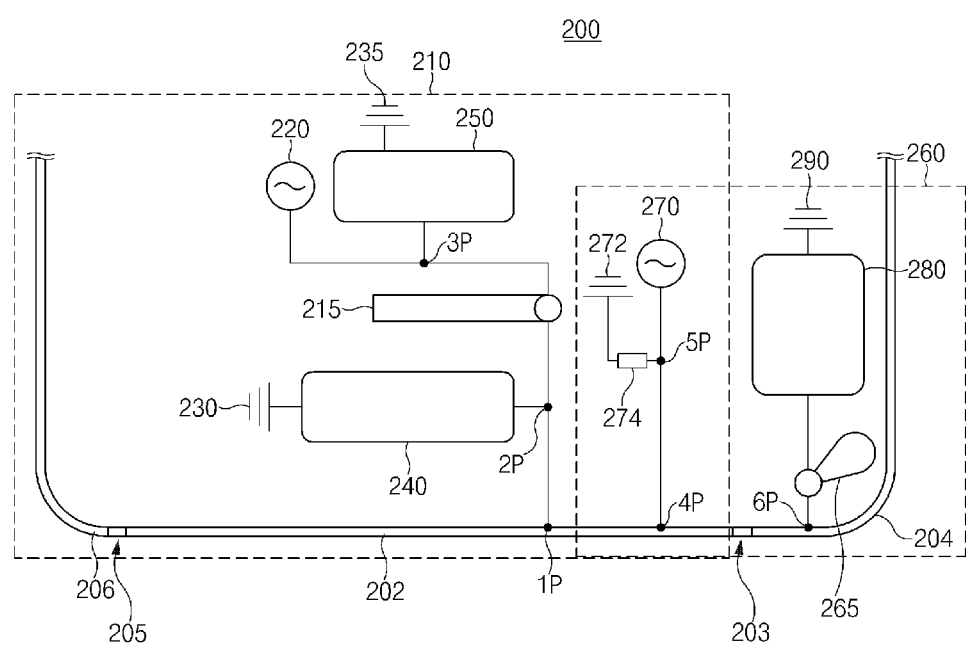
FIG. 2 is a diagram of a part of an antenna structure which uses a conductive housing of an electronic device, to which a feeder is connected, and in which ground members are connected to a metallic member and another metallic member, respectively, according to an embodiment of the present disclosure.

FIG. 2 is a diagram of a part of an antenna structure which uses a conductive housing of an electronic device, to which a feeder is connected, and in which ground members are connected to a metallic member and another metallic member, respectively, according to an embodiment of the present disclosure.

FIG. 2 illustrates an interior of a lower end of an electronic device 200. The electronic device 200 may include a side housing including a first metallic member 202, a second metallic member 204, a third metallic member 206, a first segmenting part 203 between an end of the first metallic member 202 and an end of the second metallic member 204, and a second segmenting part 205 between an end of the first metallic member 202 and the third metallic member 206.

The electronic device 200 may include a housing including a first surface (e.g., the direction of a display panel of the electronic device 200), a second surface (e.g., the direction of a battery cover of the electronic device 200) facing an opposite direction of the first surface, and a side surface surrounding at least a portion of a space between the first surface and the second surface. A PCB, on which at least one electronic component is mounted, an FPCB, and a battery may be included in the interior of the housing.

The electronic device 200 may include a first antenna 210 and a second antenna 260. The first antenna 210 may include a conductive pattern 215, a feeder 220, a first ground member 230, a second ground member 235, a first electrical variable element 240, and a second electrical element 250. The first antenna 210 may use at least a portion of the first to third metallic members 202 to 206 as a conductive pattern. Similarly, the second antenna 260 may include a conductive pattern 265, a feeder 270, a first ground member 272, an electrical variable element 280, and a second ground member 290. The second antenna 260 may use at least a portion of the first to third metallic members 202 to 206 as a conductive pattern.

The conductive pattern 215 of the first antenna 210 and the conductive pattern 265 of the second antenna 260 may be present in various forms, and may be engraved in a nonconductive member in a laser direct structuring (LDS) method.

The first electrical variable element 240 and the electrical variable element 280 may include a switch (e.g., SP2T or SP3T) and a plurality of electrically different components (e.g., an inductor, a capacitor, and a resistor). The second electrical variable element 250 may be a tuner (e.g., an RF1135).

The feeder 220 of the first antenna 210 and the feeder 270 of the second antenna 260 may be connected to the first metallic member 202. The feeder 220 of the first antenna 210 may be connected to one point 1p of the first metallic member 202 through a first electrical path. Further, the first ground member 230 of the first antenna 210 may be connected to the first metallic member 202 through the first electrical variable element 240. The ground member 230 of the first antenna 210 may be connected to one point 2p of the first electrical path that connects the feeder 220 and the first metallic member 202. The conductive pattern 215 of the first antenna 210 may be connected to one point of the first electrical path that connects the feeder 220 and the first metallic member 202. The second ground member 235 may be connected to one point 3p of the first electrical path through the second electrical variable element 250 to be connected to the first metallic member 202. Point 2p may be closer to an end of the first metallic member 202 that is adjacent to the first segmenting part 203 than point 1p.

The feeder 270 of the second antenna 260 may be connected to one point 4p of the first metallic member 202 through a second electrical path. The first ground member 272 of the second antenna 260 may be connected to one point 5p of a second electrical path that connects the feeder 270 and the first metallic member 202. The second ground member 290 of the second antenna 260 may be connected to one point 6p of the third metallic member 206 through the electrical variable element 280 or a device 274 (e.g., an inductor device). Further, the conductive pattern 265 of the second antenna 260 may be connected to one point of the third electrical path that connects the second ground member 290 and the third metallic member 206.

Because a mounting space is not large enough to allow the first ground member 272 of the second antenna 260 to be connected to the second metallic member 204 and the number of the flanges of the first metallic member 202 is not large enough to allow the first ground member 272 of the second antenna 160 to be directly connected to the first metallic member 202, the first ground member 175 may be connected to the first metallic member 202 through the second electrical path.

A CP may control the first electrical variable element 240, the second electrical variable element 250, and the electrical variable element 280. By controlling the first electrical variable element 240, the second electrical variable element 250, and the electrical variable element 280, the communication circuit or the processor may adjust the resonance frequencies of the first antenna 210 and the second antenna 260. The communication circuit or the processor may allow the first antenna 210 to perform communication by using at least a portion of the conductive pattern 215 and/or the first to third metallic members 202 to 206 and change an electrical resonance by using the first electrical variable element 240 and the second electrical variable element 250 to allow the first antenna 210 to perform communication at a desired frequency band. The CP may allow the second antenna 260 to perform communication by using at least a portion of the conductive pattern 265 and/or the first to third metallic members 202 to 206 and change an electrical resonance by using the electrical variable element 280 to allow the second antenna 260 to perform communication at a desired frequency band.

The first electrical variable element 240 and the second electrical variable element 250 of the first antenna 210 may adjust the resonance frequency of the second antenna 260 based on the control result, and the electrical variable element 280 of the second antenna 260 may adjust the resonance frequency of the first antenna 210 based on the control result.

Figure 3:
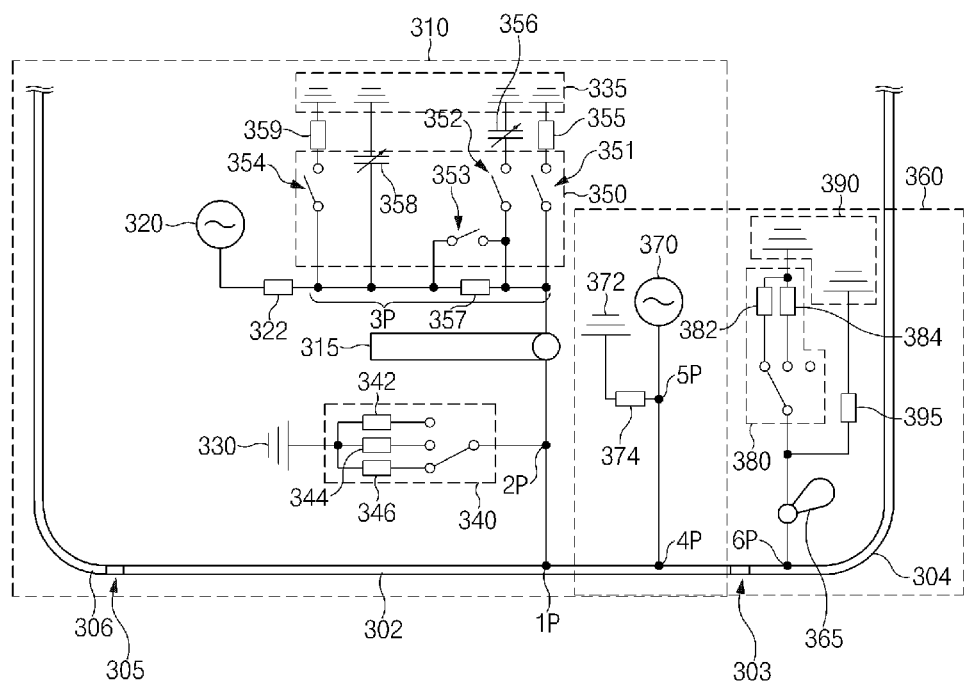
FIG. 3 is a diagram of a part of an antenna structure which uses a conductive housing of an electronic device, to which a feeder is connected, and in which ground members are connected to a metallic member and another metallic member, respectively, according to an embodiment of the present disclosure.

FIG. 3 is a diagram of a part of an antenna structure which uses a conductive housing of an electronic device, to which a feeder is connected, and in which ground members are connected to a metallic member and another metallic member, respectively, according to an embodiment of the present disclosure.

FIG. 3 illustrates an interior of a lower end of an electronic device 300. The electronic device 300 may include a side housing including a first metallic member 302, a second metallic member 304, a third metallic member 306, a first segmenting part 303 between an end of the first metallic member 302 and an end of the second metallic member 304, and a second segmenting part 305 between an end of the first metallic member 302 and an end of the third metallic member 306. The electronic device 300 may include a housing including a first surface (e.g., the direction of a display panel of the electronic device 300), a second surface (e.g., the direction of a battery cover of the electronic device 300) facing the first surface, and a side surface surrounding at least a portion of a space between the first surface and the second surface. A PCB, on which at least one electronic component is mounted, an FPCB, and a battery may be included in the interior of the housing.

The electronic device 300 may include a first antenna 310 and a second antenna 360. The first antenna 310 may include a conductive pattern 315, a feeder 320, a first ground member 330, a second ground member 335, a first electrical variable element 340, and a second electrical variable element 350. The first antenna 310 may use at least a portion of the first to third metallic members 302 to 306 as a conductive pattern. Similarly, the second antenna 360 may include a conductive pattern 365, a feeder 370, a first ground member 372, an electrical variable element 380, and a second ground member 390. The second antenna 360 may use at least a portion of the first to third metallic members 302 to 306 as a conductive pattern.

The conductive pattern 315 of the first antenna 310 and the conductive pattern 365 of the second antenna 360 may be present in various forms, and may be engraved in a nonconductive member in an LDS method.

The first electrical variable element 340 and the electrical variable element 380 may include a switch (e.g., SP2T or SP3T) and a plurality of electrically different components (e.g., an inductor, a capacitor, and a resistor). The second electrical variable element 350 may be a tuner (e.g., RF1135).

The feeder 320 of the first antenna 310 and the feeder 370 of the second antenna 360 may be connected to the first metallic member 302. The feeder 320 of the first antenna 310 may be connected to one point 1p of the first metallic member 302 through a first electrical path. The first ground member 330 of the first antenna 310 may be connected to the first metallic member 302 through the first electrical variable element 340. The first ground member 330 of the first antenna 310 may be connected to one point 2p of the first electrical path that connects the feeder 320 and the first metallic member 302. The conductive pattern 315 of the first antenna 310 may be connected to one point of the electrical path that connects the feeder 320 and the first metallic member 302. The second ground member 335 may be connected to one point 3p of the first electrical path through the second electrical variable element 350 to be connected to the first metallic member 202. Point 2p may be closer to an end of the first metallic member 303 that is adjacent to the first segmenting part 302 than point 1p.

The feeder 370 of the second antenna 360 may be connected to one point 4p of the first metallic member 202 through a second electrical path. The first ground member 372 of the second antenna 360 may be connected to one point 5p of a second electrical path that and connects the feeder 370 and the first metallic member 302 through a device 374 (e.g., an inductor device). The second ground member 390 of the second antenna 360 may be connected to one point 6p of the second metallic member 304 through the electrical variable element 380 or a device 395 (e.g., an inductor). The conductive pattern 365 of the second antenna 360 may be connected to one point of the electrical path that connects the second ground member 390 and the second metallic member 304.

Because a mounting space is not large enough to allow the first ground member 372 of the second antenna 360 to be connected to the second metallic member 304 and the number of the flanges of the first metallic member 302 is not large enough to allow the first ground member 372 of the second antenna 360 to be directly connected to the first metallic member 302, the first ground member 372 may be connected to the first metallic member 302 through the second electrical path.

A CP may control the first electrical variable element 340, the second electrical variable element 350, and the electrical variable element 380. By controlling the first electrical variable element 340, the second electrical variable element 350, and the electrical variable element 380, the communication circuit or the processor may adjust the resonance frequencies of the first antenna 310 and the second antenna 360. The CP may allow the antenna 310 to perform communication by using at least a portion of the conductive pattern 315 and/or the first to third metallic members 302 to 306 and change an electrical resonance by using the first electrical variable element 340 and the second electrical variable element 350 to allow the first antenna 310 to perform communication at a desired frequency band. The CP may allow the second antenna 360 to perform communication by using the conductive pattern 365, and change an electrical resonance by using at least a portion of the electrical variable element 380 and/or the first to third metallic members 302 to 306 to allow the second antenna 360 to perform communication at a desired frequency band.

The first electrical variable element 340 and the second electrical variable element 350 of the first antenna 310 may adjust the resonance frequency of the second antenna 360 based on the control result, and the electrical variable element 380 of the second antenna 360 may adjust the resonance frequency of the first antenna 310 based on the control result.

The first electrical variable element 340 may connect any one of a first device 342, a second device 344, and a third device 346 of the first electrical variable element 340 to a switch of the first electrical variable element 340. The first ground member 330 of the first antenna 310 may be connected to the first metallic member 302 through a device selected by the first electrical variable element 340. The first electrical variable element 340 may connect none of the first device 342, the second device 344, and the third device 346 of the first electrical variable element 340 to a switch of the first electrical variable element 340. In this case, the first ground member 330 of the first antenna 310 may not be connected to the first metallic member 302.

The second electrical variable element 350 may include a first switch 351, a second switch 352, a third switch 353, and a fourth switch 354. When the first switch 351 of the second electrical variable element 350 is closed, the second ground member 335 may be connected to the first metallic member 302 through a first device 355. When the second switch 352 of the second electrical variable element 350 is closed, the second ground member 335 may be connected to the first metallic member 302 through a second device 356 of the second electrical variable element 350. When the third switch 353 of the second electrical variable element 350 is closed, a current flows to the third switch 353 and a current does not flow to the third device 357 so that the third device 357 may be opened. When the third switch 353 of the second electrical variable element 350 is opened, a current may flow to the third device 357. Regardless of the (closed or opened) states of the first to fourth switches 351 to 354, the second ground member 335 may be connected to the first metallic member 302 through a fourth device 358 of the second electrical variable element 350. When the fourth switch 354 of the second electrical variable element 350 is closed, the second ground member 335 may be connected to the first metallic member 302 through a fifth device 359. The second electrical variable element 350 may close at least one of the first to fourth switches 351 to 354, or may open all the switches. If all the switches are opened, the feeder 320 of the first antenna 310 may be connected to the first metallic member 302 through a device 322 and the third device 357.

The electrical variable element 380 of the second antenna 360 may connect the second ground member 390 to the second metallic member 304 through one of a first device 382 or a second device 384 of the electrical variable element 380. The electrical variable element 380 may connect the second ground member 390 to the second metallic member 304 through the device 395 without using any one of the first device 382 and the second device 384. The first device 382 or the second device 384 connected through a switch of the electrical variable element 380 may be connected between the second ground member 390 and the second ground member 390 in parallel to the device 395.

An operation of the antenna including the first electrical variable element 340 and the second electrical variable element 350 of the first antenna 310, and the electrical variable element 380 of the second antenna 360 will be described with reference to FIG. 11A.

Figure 4:
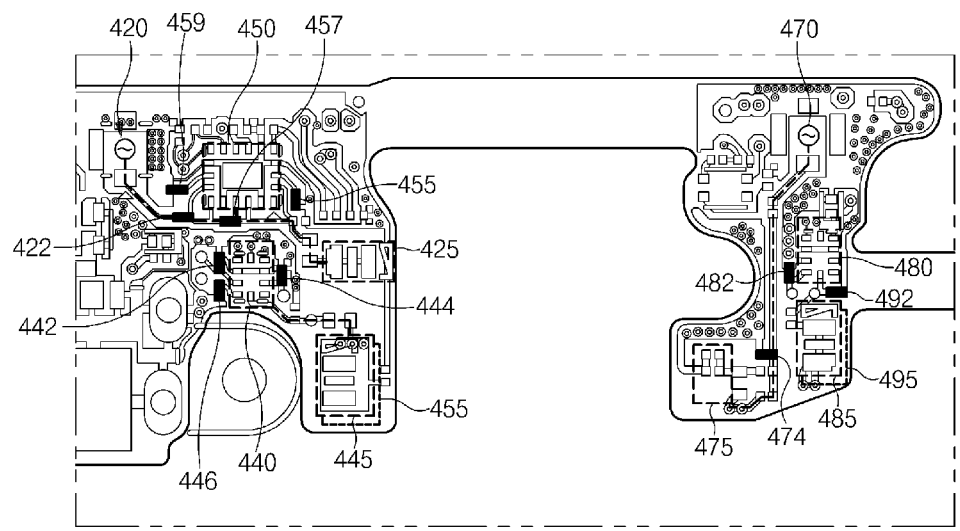
FIG. 4 is a diagram of a portion of one surface of a printed circuit board (PCB) mounted on an electronic device, according to an embodiment of the present disclosure.

FIG. 4 is a diagram of a portion of one surface of a PCB mounted on an electronic device, according to an embodiment of the present disclosure.

Referring to FIG. 4, the PCB mounted on the electronic device may include a first feeder 420 and a second feeder 470. The first feeder 420 may be the feeder 320 of the first antenna 310 of FIG. 3 and the second feeder 470 may be the feeder 370 of the second antenna 360 of FIG. 3. The PCB may include a first electrical variable element 440, a second electrical variable element 480, and a third electrical variable element 450. The first electrical variable element 440 and the third electrical element 450 may be the first electrical variable element 340 and the second electrical variable element 350 of the first antenna 310 of FIG. 3, respectively, and the second electrical variable element 480 may be the first electrical variable element 380 of the second antenna 360 of FIG. 3. The PCB may include first to sixth coupling parts 425 to 495, and the first to sixth coupling parts 425 to 495 may be C-clips.

A first device 442, a second device 444, and the third device 446 may be the first device 342, the second device 344, and the third device 346 of the first electrical variable element 340 of the first antenna 310 of FIG. 3. Further, a fourth device 422, a fifth device 455, the sixth device 457, and a seventh 459 may be the device connected to the feeder 320 of the first antenna 310 of FIG. 3, the first device 355 connected to the second ground member 335, the third device 357 connected to the device 322, and the fifth device 359 connected to the second ground member 335. An eighth device 474 may be the device 374 connected to the first ground member 372 of the second antenna 360 of FIG. 3. A ninth element 482 may be the first device 382 of the electrical variable element 382 of the second antenna 360 of FIG. 3. A tenth device 492 may be the device 395 connected to the second ground member 390 of the second antenna 360 of FIG. 3.

A signal provided by the first feeder 420 may be delivered to the first coupling part 425 along a dotted line of FIG. 4. One end of the first conductive pattern (e.g., the conductive pattern 315 of FIG. 3) may be coupled to the first coupling part 425, and the first coupling part 425 may be electrically connected the first conductive pattern. Accordingly, a signal provided by the first feeder 420 may be delivered to the first conductive pattern through the first coupling part 425.

An opposite end of the first conductive pattern may be connected to the second coupling part 445. The third coupling part 455 may be located on an opposite surface of the PCB corresponding to the location of the second coupling part 445, and the third coupling part 455 may be connected to the housing of the electronic device to a first metallic member (e.g., the first metallic member 302 of FIG. 3). The second coupling part 445 and the first metallic member may be connected to each other through a hole of the PCB. Accordingly, a signal provided by the first feeder 420 may be supplied to the first metallic member through the first conductive pattern.

One end of the first electrical variable element 440 may be connected to a second coupling part 445 along the dotted line of FIG. 4. The first electrical variable element 440 may be connected to the first metal member. One end of the third electrical variable element 450 may be connected to the first metallic member through the first coupling part 425, the first conductive pattern, the second coupling part 445, and the third coupling part 455. An opposite end of the first electrical variable element 440 and an opposite end of the third electrical variable element 450 may be connected to the ground member of the first antenna.

A signal provided by the second feeder 470 may be delivered to a fourth coupling part 475 along the dotted line of FIG. 4. The fourth coupling part 475 may be located on an opposite surface of the PCB of FIG. 4, and may be connected through a hole or the like. The fourth coupling part 475 may be connected to the first metallic member. A signal provided by the second feeder 470 may be delivered to the first metallic member through the fourth coupling part 475.

One end of the second electrical variable element 480 may be connected to a fifth coupling part 485. The fifth coupling part 485 may be connected to the sixth coupling part 495 located on an opposite surface of the PCB corresponding to the location of the fifth coupling part 485 through a hole or the like. Further, a sixth coupling part 495 may be connected to the second metallic member (e.g., the second metallic member 304 of FIG. 3). An opposite end of the second electrical variable element 480 may be connected to the ground member of the second antenna. Moreover, the sixth coupling part 495 may be connected to the second conductive pattern (e.g., the conductive pattern 465 of the second antenna 360 of FIG. 3).

Figure 5:
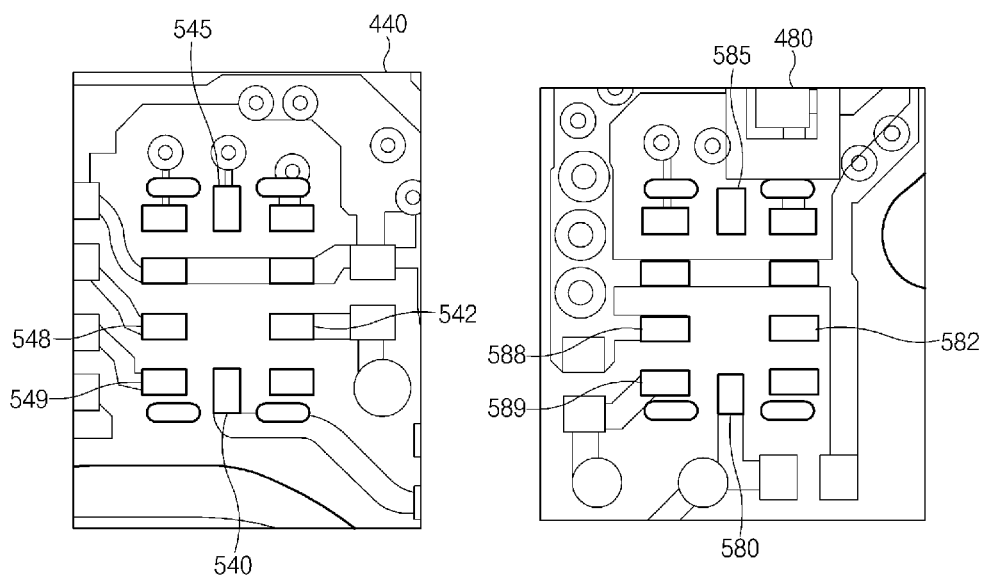
FIG. 5 is a diagram of the first electrical variable element and the third electrical variable element of FIG. 4, according to an embodiment of the present disclosure.

FIG. 5 is a diagram of the first electrical variable element and the second electrical variable element of FIG. 4, according to an embodiment of the present disclosure.

Referring to FIG. 5, the first electrical variable element 440 and/or the second electrical element 480 may receive a signal from the first feeder 410 or the second feeder 460 of FIG. 4 through feeding pins 540 and 580.

When the first electrical variable element 440 uses the first device 442 of FIG. 4 (e.g., the first device 342 of the first electrical variable element 340 of FIG. 3), the signal may be delivered from the feeding pin 540 to a pin 548. The first electrical variable element 440 may connect the feeding pin 540 and the pin 548 by using a switch, and the signal may be delivered to the first device 442 of FIG. 4.

When the first electrical variable element 440 uses the second device 444 of FIG. 4 (e.g., the second device 344 of the first electrical variable element 340 of FIG. 3), the signal may be delivered from the feeding pin 540 to a pin 542. The first electrical variable element 440 may connect the feeding pin 540 and the pin 542 by using a switch, and the signal may be delivered to the second device 444 of FIG. 4.

When the first electrical variable element 440 uses the second device 446 of FIG. 4, the signal may be delivered from the feeding pin 540 to a pin 549. The first electrical variable element 440 may connect the feeding pin 540 and the pin 549 by using a switch, and the signal may be delivered to the third device 446 of FIG. 4.

When the second electrical variable element 480 uses a ninth device 482 of FIG. 4 (e.g., the first device 382 of the electrical variable element 380 of FIG. 3), the signal may be delivered from the feeding pin 580 to a pin 588. The second electrical variable element 480 may connect the feeding pin 580 and the pin 588 by using a switch, and the signal may be delivered to the ninth device 482 of FIG. 4.

When the second electrical variable element 480 uses a short-circuit device (e.g., the second device 384 of the electrical variable element 380 of FIG. 3), the signal may be delivered from the feeding pin 580 to a9 pin 589. The third electrical variable element 480 may connect the feeding pin 580 and the pin 589 by using a switch, and the signal may be delivered to the short-circuit device. The short-circuit device may be a device of 0 Ohm or may be implemented without any device. The ground member connected to one end of the second electrical variable element 480 (e.g., the first device 382 and/or the second device 384 of the electrical variable device 380 of the second antenna 360 of FIG. 3) and the second metallic member (e.g., the second metallic member 304 of FIG. 3) may be connected to each other without using a device.

When the second electrical variable element 480 is used in an off state, the signal may be delivered from the feeding pin 580 to the pin 582. The second electrical variable element 480 may connect the feeding pin 580 and the pin 582 by using a switch, and the ground member connected to one end of the second electrical variable element 480 and the second metallic member may not be connected to each other.

Figure 6:
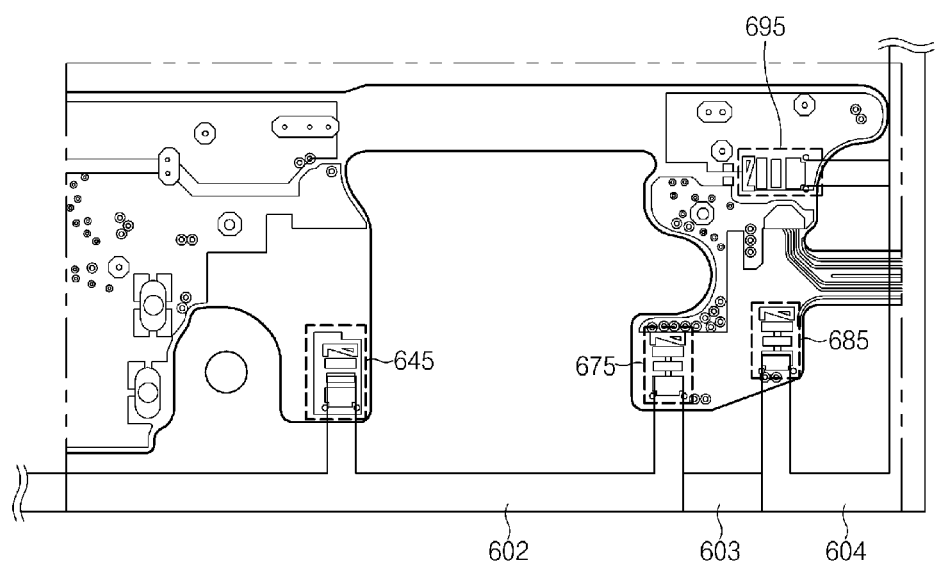
FIG. 6 is a diagram of a portion of an opposite surface of the printed circuit board (PCB) mounted on the electronic device of FIG. 4, according to an embodiment of the present disclosure.

FIG. 6 is a diagram of a portion of an opposite surface of the PCB mounted on the electronic device of FIG. 4, according to an embodiment of the present disclosure.

At least a portion of the opposite surface of the PCB of FIG. 6 may include a first coupling part 645, a second coupling part 675, a third coupling part 685, and a fourth coupling part 695. The first coupling part 645, the second coupling part 675, and the third coupling part 685 may be the third coupling part 455, the fourth coupling part 475, and the sixth coupling part 495 of FIG. 4, respectively.

The first coupling part 645 and the second coupling part 675 may be connected to a first metallic member 602 (e.g., the first metallic member 302 of FIG. 3), and the third coupling part 685 and the fourth coupling part 695 may be connected to a second metallic member 604 (e.g., the second metallic member 304 of FIG. 3). A nonconductive segmenting part 603 may be located between an end of the first metallic member 602 and an end of the second metallic member 604.

A first feeder (e.g., the first feeder 420 of FIG. 4) may provide a signal to the first metallic member 602 through the first coupling part 645, and a second feeder (e.g., the second feeder 470 of FIG. 4) may provide a signal to the first metallic member 602 through the second coupling part 675.

Figure 7:
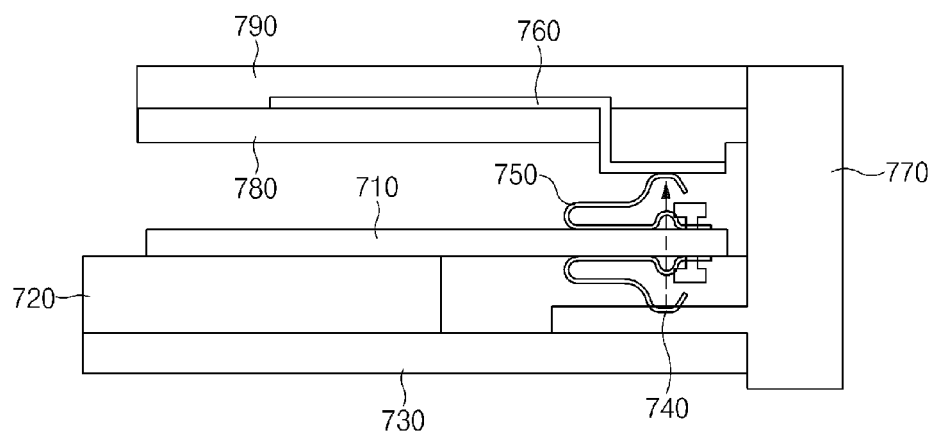
FIG. 7 is a diagram of a portion of a section of an electronic device, when viewed from a lateral side, according to an embodiment of the present disclosure.

FIG. 7 is a diagram of a section of an electronic device, when viewed from a lateral side, according to an embodiment of the present disclosure.

The electronic device may include a PCB 710, a bracket 720, a display panel 730, a metallic member 770, a rear case 780, and a battery cover 790. The bracket 720 and the metallic housing 770 are conductive, and the rear case 780 and the battery cover 790 may be nonconductive.

A first coupling part 740 and a second coupling part 750 may be provided on opposite surfaces of the PCB 710. The first coupling part 740 and the second coupling part 750 may be the second coupling part 445 and the third coupling part 455 of FIG. 4. The first coupling part 740 and the second coupling part 750 may be the fifth coupling part 485 and the sixth coupling part 495 of FIG. 4. The first coupling part 740 and the second coupling part 750 may be connected to each other through a hole or the like.

When the metallic member 770 (e.g., the first coupling part 740 and the second coupling part 750) corresponds to the second coupling part 445 and the third coupling part 455 of FIG. 4, the first coupling part 740, the first metallic member 602 of FIG. 6, or the first coupling part 740 and the second coupling part 750 may be connected to the fifth coupling part 485 and the sixth coupling part 495 of FIG. 4 and the second metallic member 604 of FIG. 6. Further, the second coupling part 750 may be connected to a conductive pattern 760 (e.g., the conductive pattern 315 of the first antenna 310 of FIG. 3 or the conductive pattern 365 of the second antenna 360 of FIG. 3). The conductive pattern 760 may be engraved in the nonconductive rear case 780 in an LDS manner.

As described above, because the first coupling part 740 and the second coupling part 750 may be connected to each other through a hole or the like, the conductive pattern 760 and the metallic housing 770 may be electrically connected to each other to function as radiators configured to determine a communication frequency and perform communication.

Figure 8:
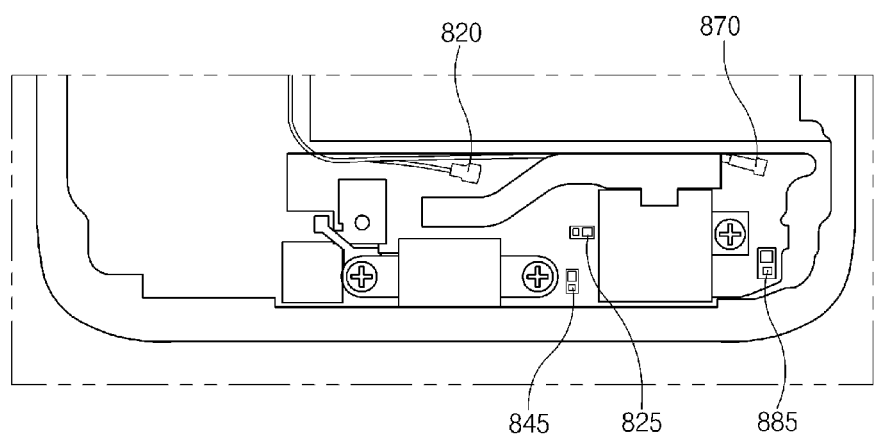
FIG. 8 is a diagram of a portion of an interior of an electronic device, according to an embodiment of the present disclosure.

FIG. 8 is a diagram of an interior of an electronic device, according to an embodiment of the present disclosure.

The interior of the electronic device of FIG. 8 may correspond to at least a portion of a rear surface of the electronic device in a state in which a battery cover (e.g., the battery cover 790 of FIG. 7) and a rear case (e.g., the rear case 780 of FIG. 7) of the electronic device are not mounted.

The electronic device of FIG. 8 includes one surface of the PCB of FIG. 4. The electronic device may include a first feeder 820 and a second feeder 870. The first feeder 820 and/or the second feeder 870 may be the first feeder 420 and/or the second feeder 470 of FIG. 4, respectively.

The PCB of the electronic device may include a first coupling part 825, a second coupling part 845, and a third coupling part 885 on one surface thereof. The first coupling part 825, the second coupling part 845, and the third coupling part 885 may be the first coupling part 425, the second coupling part 445, and the fifth coupling part 485 of FIG. 4, respectively. The first coupling part 825, the second coupling part 845, and the third coupling part 885 may include C-clips.

Figure 9:
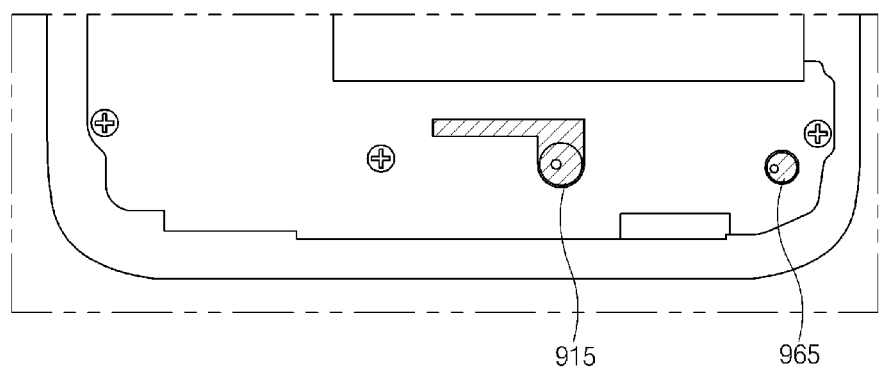
FIG. 9 is a diagram of a portion of an interior of an electronic device, according to an embodiment of the present disclosure.

FIG. 9 is a diagram of an interior of an electronic device, according to an embodiment of the present disclosure.

The electronic device of FIG. 9 illustrates that the rear case is mounted at at least a portion of the rear surface of the electronic device of FIG. 8.

The electronic device may include an LDS type conductive pattern. The electronic device may include a first conductive pattern 915 and a second conductive pattern 965. The first conductive pattern 915 and the second conductive pattern 965 may be the conductive pattern of the first antenna 310 of FIG. 3 and the conductive pattern of the second antenna 320.

Figure 10:
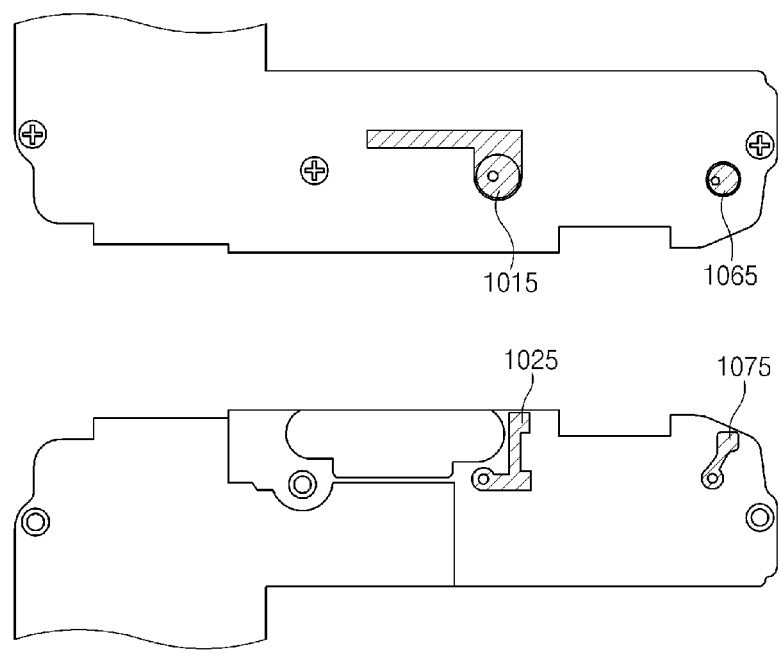
FIG. 10 is a diagram of a portion of a rear case of an electronic device, according to an embodiment of the present disclosure.

FIG. 10 is a diagram of a rear case of an electronic device, according to an embodiment of the present disclosure.

The rear case illustrated at an upper portion of FIG. 10 may be the rear case of FIG. 9 and may be a rear case viewed from a rear side of the electronic device. The rear case illustrated at a lower portion of FIG. 10 may be one obtained by overturning the rear case illustrated at the upper end of FIG. 10. The rear case illustrated at the upper portion of FIG. 10 may face the rear side of the electronic device when being mounted, and the rear case illustrated at the lower portion of FIG. 10 may face the front side of the electronic device when being mounted.

A first conductive pattern 1015 and a second conductive pattern 1065 may be included on the rear surface (facing the battery cover) of the rear case. The first conductive pattern 1015 and the second conductive pattern 1065 may correspond to the first conductive pattern 915 and the second conductive pattern 965 of FIG. 9.

A third conductive pattern 1025 electrically connected to the first conductive pattern 1015 and a fourth conductive pattern 1075 electrically connected to the second conductive pattern 1065 may be included on the rear surface (facing the display panel) of the rear case.

Referring to FIG. 10, a hole of the first conductive pattern 1015 may be connected to a hole of the third conductive pattern 1025. Further, a hole of the second conductive pattern 1065 may be connected to a hole of the fourth conductive pattern 1075.

Figures 11A, 11B, 11C:
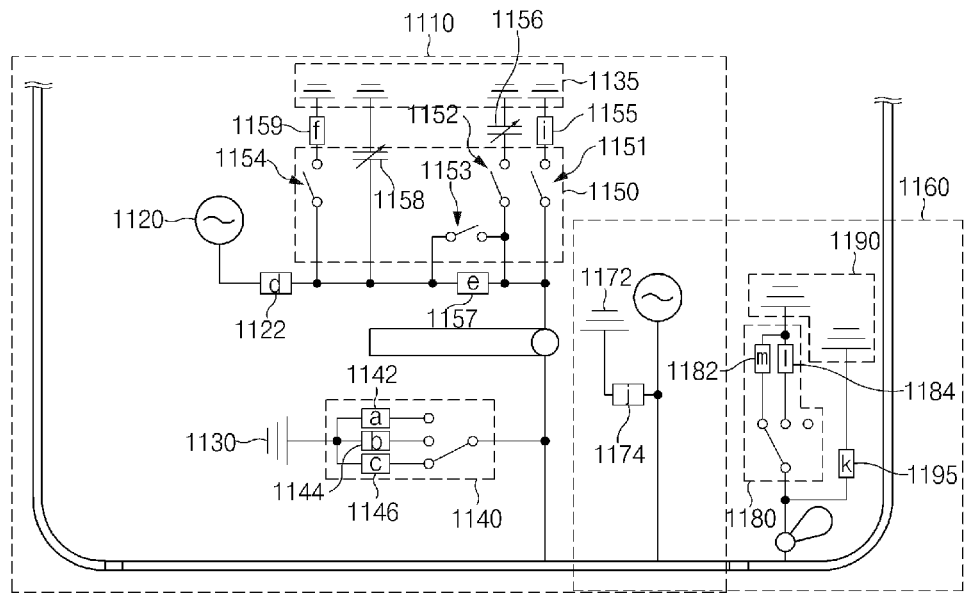
FIG. 11A is a circuit diagram illustrating an antenna of an electronic device, according to an embodiment of the present disclosure.
FIG. 11B is a table illustrating values of devices illustrated in the circuit diagram, according to an embodiment of the present disclosure.
FIG. 11C is a diagram of a communication operation based on switching, according to an embodiment of the present disclosure.

FIG. 11A is a circuit diagram of an antenna of an electronic device, according to an embodiment of the present disclosure. FIG. 11B is a table illustrating values of devices illustrated in the circuit diagram, according to an embodiment of the present disclosure. FIG. 11C is a view illustrating a communication operation based on switching, according to an embodiment of the present disclosure.

FIG. 11A illustrates an antenna including a conductive metallic member located between nonconductive segmenting parts (ends) and two or more feeders connected to the metallic member. The table of FIG. 11B illustrates device values (e.g., inductance values, capacitance values, or resistance values) of devices 1122, 1142, 1144, 1146, 1155, 1156, 1157, 1158, 1159, 1174, 1182, 1184, and 1195 illustrated in FIG. 11A. The table of FIG. 11C illustrates switching operations for communication frequency bands.

The circuit diagram of FIG. 11A is a circuit diagram including an antenna located at a lower end of the electronic device, and may at least partially correspond to the circuit diagram of FIG. 3, so a repeated description thereof will be omitted.

Referring to FIG. 11B, a first device 1142 of the first electrical variable element 1140 of a first antenna 1110 may be an inductor of 2.2 nH, the second device 1144 of the first electrical variable element 1140 may be a capacitor of 100 pF, and the third device 1146 of the first electrical variable element 1140 may be a capacitor of 1.2 pF.

The device 1122 connected to a feeder 1120 of the first antenna 1110 may be a capacitor of 100 pF.

The first device 1155 of the first antenna 1110 may be an inductor of 8.2 nH, the second device 1156 and the fourth device 1158 of the second electrical variable element 1150 may be variable capacitors (e.g., a value between 0.5 pF to 7.5 pF), the third device 1157 may be an inductor of 1.2 nH, and the fifth device 1159 may be an inductor of 15 nH.

The device 1174 connected to a first ground member 1172 of a second antenna 1160 may be an inductor of 2.7 nH. The first device 1182 of an electrical variable element 1180 of the second antenna 1160 may be an inductor of 5.6 nH, and the second device 1184 of the electrical variable element 1180 may be a resistor (short-circuit member) of 0 Ohm and may have no device. Further, a device 1190 connected to the second ground member of the second antenna 1160 may be an inductor of 12 nH.

Referring to FIG. 11C, when the second device 1144 of the first electrical variable element 1140 of the first antenna 1110 is connected to the first ground member 1130, a second electrical variable element 1150 of the first antenna 1110 is not used, and the electrical variable element of the second antenna 1160 is opened, the communication circuit of the electronic device may be operated as long-term evolution (LTE) band 5 or LTE band 17. When all of the first to fourth switches 1151 to 1154 of the second electrical variable element 1150 may be opened and the fourth device 1158 is set to 0.5 pF, it may be determined that the second electrical variable element 1150 is not used.

When the first device 1142 of the first electrical variable element 1140 of the first antenna 1110 is connected to the first ground member 1130, the first switch 1151 and the fourth switch 1154 of the second electrical variable element 1150 of the first antenna 1110 are opened, the second switch 1152 and the third switch 1153 are connected, and the electrical variable element 1180 of the second antenna 1160 is opened, the communication circuit of the electronic device may support LTE band 8. The second device 1156 of the second electrical variable element 1150 of the first antenna 1110 may be 2.37 pF, and the fourth device 1158 may be 0.5 pF.

When the third device 1146 of the first electrical variable element 1140 of the first antenna 1110 is connected to the first ground member 1130, the second electrical variable element 1150 of the first antenna 1110 is not used, and the electrical variable element 1180 of the second antenna 1160 is opened, the communication circuit of the electronic device may support LTE band 3. The second electrical variable element 1150 may correspond to a case in which all of the first to fourth switches 1151 to 1154 are opened and the fourth device 1158 is 0.5 pF.

When the first electrical variable element 1140 of the first antenna 1110 is opened, the second electrical variable element 1150 of the first antenna 1110 is not used, and the first device 1182 of the electrical variable element 1180 of the second antenna 1160 is connected to the second ground member 1190, the communication circuit of the electronic device may support LTE band 1. The second electrical variable element 1150 may correspond to a case in which all of the first to fourth switches 1151 to 1154 are opened and the fourth device 1158 is 0.5 pF.

When the first electrical variable element 1140 of the first antenna 1110 is opened, the second electrical variable element 1150 of the first antenna 1110 is not used, and the second device 1184 of the electrical variable element 1180 of the second antenna 1160 is connected to the second ground member 1190, the communication circuit of the electronic device may support LTE band 7. The second electrical variable element 1150 may correspond to a case in which all of the first to fourth switches 1151 to 1154 are opened and the fourth device 1158 is 0.5 pF.

When the third device 1146 of the first electrical variable element 1140 of the first antenna 1110 is connected to the first ground member 1130, the second electrical variable element 1150 of the first antenna 1110 is not used, and the first device 1182 of the electrical variable element 1180 of the second antenna 1160 is connected to the second ground member 1190, the communication circuit of the electronic device may support WCDMA2. The second electrical variable element 1150 may correspond to a case in which all of the first to fourth switches 1151 to 1154 are opened and the fourth device 1158 is 0.5 pF.

FIG. 12 is a table illustrating communication operations of a first antenna and a second antenna of an electronic device, according to an embodiment of the present disclosure.

Referring to FIG. 12, "1140" may refer to the first electrical variable element 1140 of the first antenna 1110 of FIG. 11A, "a" may refer to a state in which the first device 1142 of the first electrical variable element 1140 of the first antenna 1110 of FIG. 11A is connected to the first ground member 1130 of the first antenna 1110 of FIG. 11A, "b" may refer to a state in which the second device 1144 of the first electrical variable element 1140 of the first antenna 1110 of FIG. 11A is connected to the first ground member 1130 of the first antenna 1110 of FIG. 11, "c" may refer to a state in which the third device 1146 of the first electrical variable element 1140 of the first antenna 1110 of FIG. 11A is connected to the first ground member 1130 of the first antenna 1110 of FIG. 11A, and "Open" may mean a state in which the first to third devices 1142 to 1146 of the first electrical variable element 1140 of the first antenna 1110 of FIG. 11A are not connected to the first ground member 1130 of the first antenna 1110 of FIG. 11A.

Moreover, "1180" may refer to the electrical variable element 1180 of the second antenna 1160 of FIG. 11A, "m" may refer to a state in which the first device 1182 of the electrical variable element 1180 of the second antenna 1160 of FIG. 11A is connected to the second ground member 1190 of the second antenna 1160 of FIG. 11A, "1" may refer to a state in which the second device 1184 of the first electrical variable element 1140 of the second antenna 1160 of FIG. 11A is connected to the second ground member 1190 of the second antenna 1160 of FIG. 11A, and "Open" may mean a state in which neither the first device 1182 nor the second device 1184 of the electrical variable element 1180 of the second antenna 1160 of FIG. 11A is connected to the second ground member 1190 of the second antenna 1160 of FIG. 11A.

Furthermore, "1150" may refer to the second electrical variable element 1150 of the first antenna 1110 of FIG. 11A, and the second electrical variable element 1150 of the first antenna 1110 of FIG. 11A may be used when being set to a specific value. In FIG. 12, the second electrical variable element 1150 of the first antenna 1110 of FIG. 11A is referred to as 1150 for convenience' sake.

The second electrical variable element 1150 of the first antenna 1110 of FIG. 11A may correspond to a state in which the first switch 1151 and the fourth switch 1154 of the second electrical variable element 1150 of the first antenna 1110 of FIG. 11A are opened, the second switch 1152 and the third switch 1153 are connected to each other, the second device 1156 is 2.37 pF, and the fourth device 1158 is set to 0.5 pF. The second electrical variable element 1150 of the first antenna 1110 of FIG. 11A may not be used except for when the antenna is operated as LTE band 8. The second electrical variable element 1150 of the first antenna 1110 of FIG. 11A may correspond to a state in which all of the first to fourth switches 1151 to 1154 of the second electrical variable element 1150 of the first antenna 1110 of FIG. 11A are opened and the fourth device 1158 is not used when being set to a value of 0.5 pF.

When 1140 corresponds to state "b" and 1180 corresponds to an opened state, the first antenna 1110 may perform Tx/Rxs of LTE bands 5 and 17. When 1140 corresponds to state "a," 1180 corresponds to an opened state, and 1150 corresponds to an on state, the first antenna 1110 may perform Tx/Rx of LTE band 8.

When 1140 corresponds to state "c" and 1180 corresponds to an opened state, the first antenna 1110 may perform Rx of LTE band 3 and the second antenna 1160 may perform Tx/Rx of LTE band 3. When 1140 corresponds to state "c" and 1180 corresponds to state m, the first antenna 1110 may perform Rx of LTE band 2 and the second antenna 1160 may perform Tx/Rx of LTE band 2. When 1140 corresponds to an opened state and 1180 corresponds to state "m," the first antenna 1110 may perform Rx of LTE band 1 and the second antenna 1160 may perform Tx/Rx of LTE band 1. When 1140 corresponds to an opened state and 1180 corresponds to state "1," the first antenna 1110 may perform Rx of LTE band 7 and the second antenna 1160 may perform Tx/Rx of LTE band 7.

Figure 13:
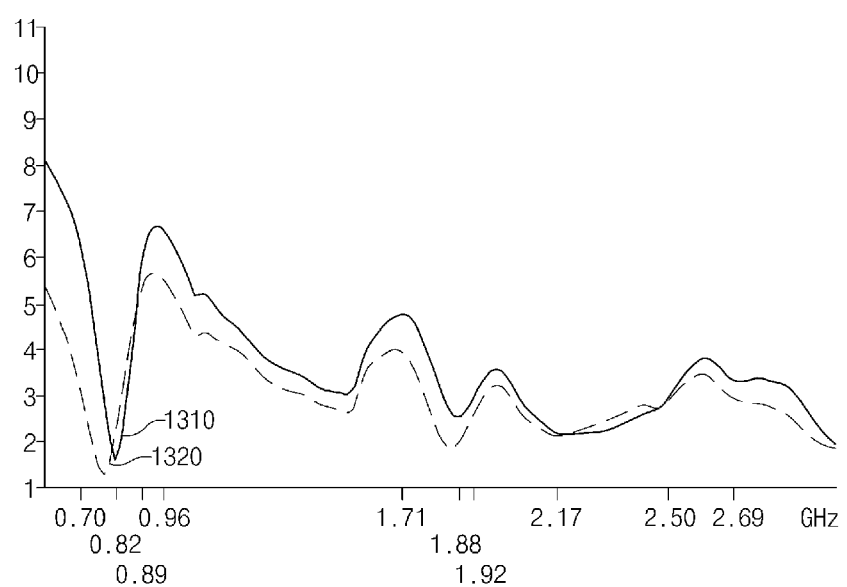
FIG. 13 is a graph (VSWR) of a first antenna, according to an embodiment of the present disclosure.

FIG. 13 is a graph (voltage standing wave ratio (VSWR)) of a first antenna, according to various embodiments of the present disclosure.

Referring to FIG. 13, the first graph 1310 may be a graph in which the first device 1142 of the first electrical variable element 1140 of the first antenna 1110 of FIG. 11A is connected to the first ground member 1130 and the second electrical variable element 1150 is used, and the second graph 1320 may be a graph in which the second device 1144 of the first electrical variable element 1140 of the first antenna 1110 of FIG. 11A is connected to the first ground member 1130. The first graph 1310 may be a graph corresponding to when the first antenna 1110 of FIG. 11A supports LTE band 8, and the second graph 1320 may be a graph corresponding to when the first antenna 1110 of FIG. 11A supports LTE band 5 or LTE band 17.

An antenna used for an electronic device has an inverted-f antenna (IFA) or a monopole radiation body as a basic structure, and the volume and number of the mounted antenna radiation bodies may be determined depending on frequencies, bandwidths, or kinds of services. Frequencies are different for areas of the globe, but low frequency bands of 700 MHz to 990 MHz, middle frequency bands of 1700 MHz to 2100 MHz, and high frequency bands of 2300 MHz to 2700 MHz are used as main communication frequency bands. Further, the electronic devices use various wireless communication services such as bluetooth (BT), global positioning system (GPS), and wireless-fidelity (Wi-Fi), and it is realistically difficult to support all the frequency bands only with one antenna in a limited volume of the electronic device.

Frequency bands that have to be implemented in a European product are 24 frequency bands of 2G (GSM850, EGSM, DCS, and PCS), WCDMA (B1, B2, B5, and B8) and LTE (B1, B2, B3, B4, B5, B7, B8, B12, B17, B18, B19, B20, B26, B38, B39, B40, B41). Because it is difficult to satisfy the specifications required by businesses, satisfy a specific absorption rate (SAR) reference, and minimize influences on the human bodies while implementing all the frequency band in one antenna, service bands having similar frequency bands over at least two areas may be combined to implement an antenna. For example, it may be designed such that one antenna supports 2G (GSM850, EGSM, DCS, and PCS), WCDMA (B1, B2, B5, and B8) and LTE (B1, B2, B3, B4, B5, B8, B12, B17, B18, B19, B20, B26, and B39) and another antenna supports LTE (B7, B38, B40, and B41).

In general, in order to operate two antennas in different frequency bands, respectively, the antennas have to receive electric power by using different RF ports (feeders), and in order to minimize influences of the two antennas on each other, the antennas have to be maximally spaced apart from each other.

For example, one antenna may be disposed at a left end of the electronic device, and another antenna may be disposed at a right end of the electronic device. If it is designed such that different antennas support a low frequency band (e.g., B20, B8, B17, or the like), it can be difficult to secure an isolation of λ/4 or more that is a minimum distance by which an isolation may be secured, when it is considered that the width of a general electronic device (e.g., a smartphone) is about 70 mm to 80 mm (λ/4 of a low frequency band (e.g., 900 MHz) is about 80 mm. However, because the low frequency band may be secured by a switching technology, a penta-band antenna that supports a low frequency band may be implemented by one antenna and an antenna that supports a high frequency, such as LTE B7, B38, B40, and B41, that is, a high frequency band may be designed using another antenna. However, in this case, because the length of the antenna is relatively short, the performance of the antenna may be lowered by an influence of the human body when the antenna is gripped by a hand.

For example, it can be seen from FIG. 13 that the first antenna 1110 is operated a low frequency band (about 800 MHz or about 900 MHz) and a middle frequency band (about 1800 MHz). The first antenna 1110 may perform band switching based on a connecting operation of the first electrical variable element 1140. The electronic device may select a frequency band suitable for a scenario, from LTE band 8, LTE band 5, and LTE band 17, through a connecting operation of the first electrical variable element 1140 of the first antenna 1110 of FIG. 11A.

Figure 14:
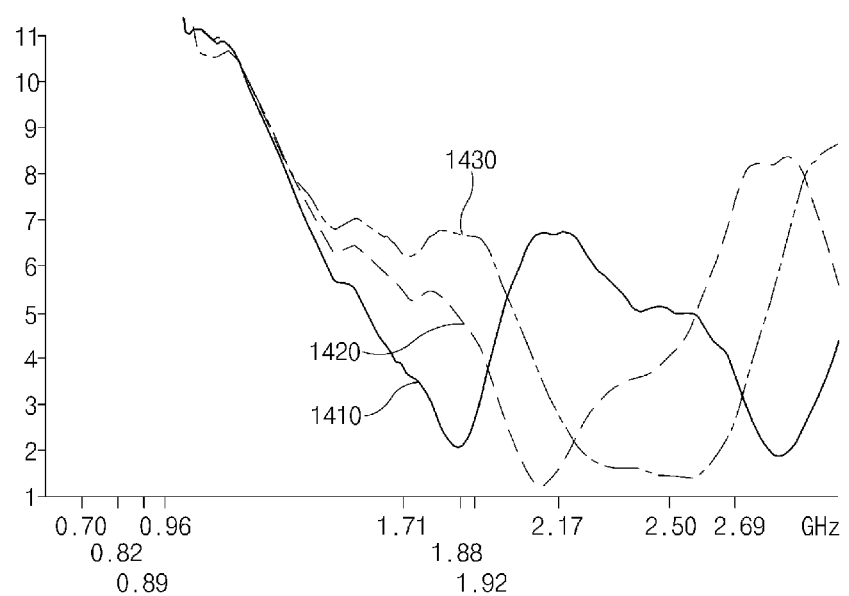
FIG. 14 is a graph (VSWR) of a second antenna, according to an embodiment of the present disclosure.

FIG. 14 is a graph (VSWR) of a second antenna, according to an embodiment of the present disclosure.

Referring to FIG. 14, a first graph 1410 is a graph in which the third device 1146 of the first electrical variable element 1140 of the first antenna 1110 is connected to the first ground member 1130, a second graph 1420 is a graph in which the first device 1182 of the electrical variable element 1180 of the second antenna 1160 is connected to the second ground member 1190, and a third graph 1430 is a graph in which the second device 1184 of the electrical variable element 1180 of the second antenna 1160 is connected to the second ground member 1190. The first graph 1410 may be a graph corresponding to when the first antenna 1110 and the second antenna 1160 of FIG. 11A are operated as LTE band 2 or LTE band 3, the second graph 1420 may be a graph corresponding to when the first antenna 1110 and the second antenna 1160 are operated as LTE band 1, and the third graph 1430 may be a graph corresponding to when the first antenna 1110 and the second antenna 1160 of FIG. 11A are operated as LTE band 7.

For example, it can be seen from FIG. 14 that the second antenna 1160 performs band switching based on a connecting operation of the electrical variable element 1180 of the second antenna 1160.

The electronic device may select a frequency band suitable for a scenario, from LTE band 2, LTE band 3, LTE band 1, or LTE band 7, through a connecting operation of the first electrical variable element 1140 of the first antenna 1110 of FIG. 11A and the electrical variable element 1180 of the second antenna 1160.

Figure 15:
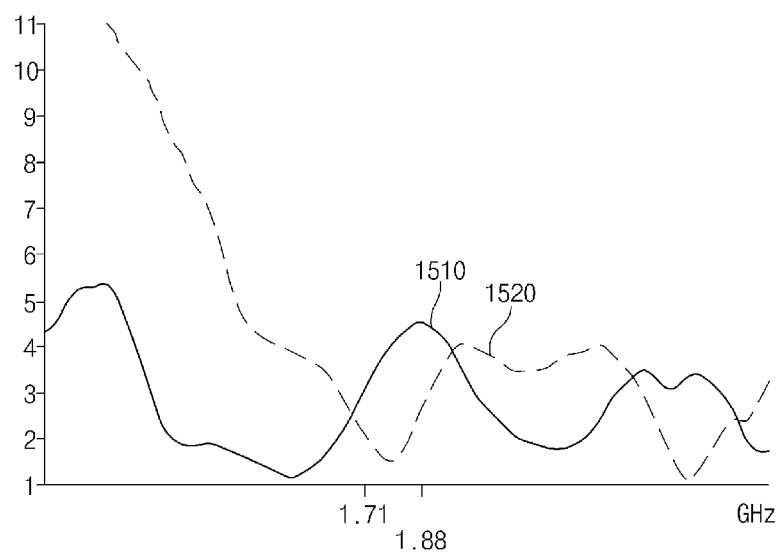
FIG. 15 is a graph (VSWR) of a first antenna and a second antenna, according to an embodiment of the present disclosure.

FIG. 15 is a graph (VSWR) of a first antenna and a second antenna, according to an embodiment of the present disclosure.

FIG. 15 illustrates graphs of the first antenna 1110 and the second antenna 1160 that are operated as LTE band 3 or LTE band 2 (e.g., the third device 1146 of the first electrical variable element 1140 of the first antenna 1110 is connected, the second electrical variable element 1150 of the first antenna 1110 is opened, and the electrical variable element 1180 of the second antenna 1160 is opened).

For example, the first graph 1510 is a graph of the first antenna 1110 and the second graph 1520 is a graph of the second antenna 1160.

In order to reduce an interference between the first antenna 1110 and the second antenna 1160 of FIG. 11A at LTE band 3 or LTE band 2, the electronic device may control at least one of the first electrical variable element 1140 and the second electrical variable element 1150 of the first antenna 1110 and the electrical variable element 1180 of the second antenna 1160. The first graph 1510 and the second graph 1520 of FIG. 15 may correspond to VSWR measurement values of the antennas illustrating that an interference between the first antenna 1110 and the second antenna 1160 of FIG. 11A may be reduced. The electronic device may be optimally designed at detailed frequency bands such that an interference between the antennas may be reduced.

Figure 16:
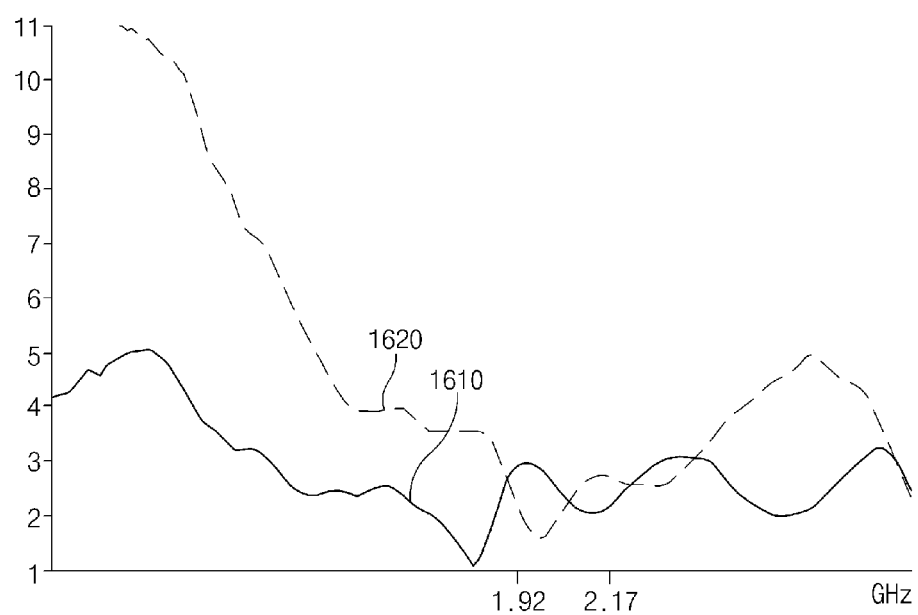
FIG. 16 is a graph (VSWR) of a first antenna and a second antenna, according to an embodiment of the present disclosure.

FIG. 16 is a graph (VSWR) of a first antenna and a second antenna, according to an embodiment of the present disclosure.

FIG. 16 illustrates graphs of the first antenna 1110 and the second antenna 1160 that are operated as LTE band 1 (e.g., the first electrical variable element 1140 of the first antenna 1110 is opened, the second electrical variable element 1150 of the first antenna 1110 is opened, and the first device 1182 of the electrical variable element 1180 of the second antenna 1160 is connected).

For example, the first graph 1610 is a graph of the first antenna 1110 and the second graph 1620 is a graph of the second antenna 1160.

In order to reduce an interference between the first antenna 1110 and the second antenna 1160 of FIG. 11A at LTE band 1, the electronic device may control at least one of the first electrical variable element 1140 and the second electrical variable element 1150 of the first antenna 1110 and the electrical variable element 1180 of the second antenna 1160. The first graph 1610 and the second graph 1620 of FIG. 16 may correspond to VSWR measurement values of the antennas illustrating that an interference between the first antenna 1110 and the second antenna 1160 of FIG. 11A may be reduced. The electronic device may be optimally designed at detailed frequency bands such that an interference between the antennas may be reduced.

Figure 17:
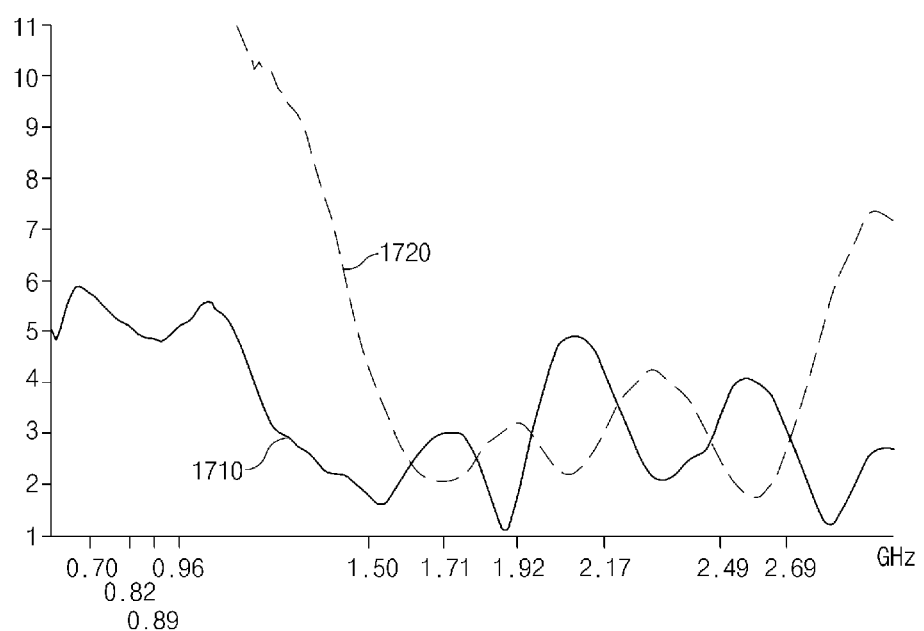
FIG. 17 is a graph (VSWR) of a first antenna and a second antenna, according to an embodiment of the present disclosure.

FIG. 17 is a graph (VSWR) of a first antenna and a second antenna, according to an embodiment of the present disclosure.

FIG. 17 illustrates graphs of the first antenna 1110 and the second antenna 1160 that are operated as LTE band 7 (e.g., the first electrical variable element 1140 of the first antenna 1110 is opened, the second electrical variable element 1150 of the first antenna 1110 is opened, and the second device 1184 of the electrical variable element 1180 of the second antenna 1160 is connected).

For example, the first graph 1710 is a graph of the first antenna 1110 and the second graph 1720 is a c graph of the second antenna 1160.

In order to reduce an interference between the first antenna 1110 and the second antenna 1160 of FIG. 11A at LTE band 7, the electronic device may control at least one of the first electrical variable element 1140 and the second electrical variable element 1150 of the first antenna 1110 and the electrical variable element 1180 of the second antenna 1160. The first graph 1710 and the second graph 1720 of FIG. 17 may correspond to VSWR measurement values of the antennas illustrating that an interference between the first antenna 1110 and the second antenna 1160 of FIG. 11A may be reduced. The electronic device may be optimally designed at detailed frequency bands such that an interference between the antennas may be reduced.

Figure 18:
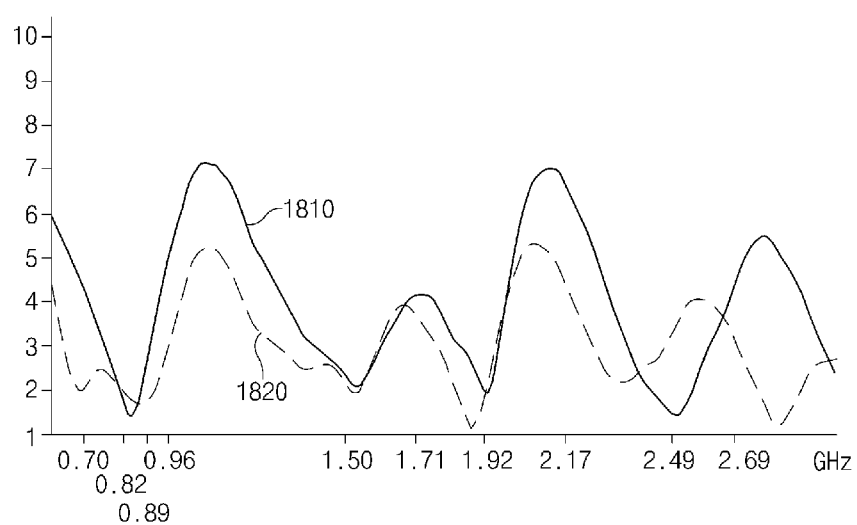
FIG. 18 is a graph (VSWR) of a second antenna based on presence of the first ground member, according to an embodiment of the present disclosure.

FIG. 18 is a graph (VSWR) of a first antenna based on presence of the first ground member of a second antenna, according to an embodiment of the present disclosure.

Referring to FIG. 18, the first graph 1810 is a graph of the first antenna 1110 corresponding to a case in which the first ground member 1172 of the second antenna 1160 is present, and the second graph 1820 is a graph of the first antenna 1110 corresponding to a case in which the first ground member 1172 of the second antenna 1160 is not present.

Referring to the first graph 1810 and the second graph 1820, it can be seen that when the first ground member 1172 is not present, the antenna characteristic at 800 MHz is not good as compared with the case in which the first ground member 1172 is present. For example, it can be seen that when the first ground member 1172 is not present, the first antenna 1110, the first antenna 1110 fails to show good characteristics at one low frequency band and the characteristics of the first antenna 1110 are bifurcated to become dull.

Figure 19:
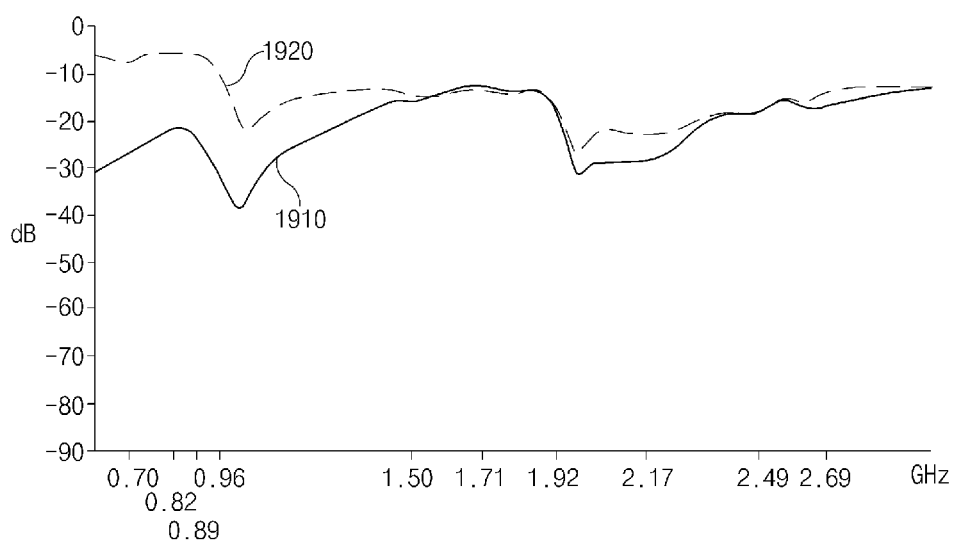
FIG. 19 is a graph (characteristic S21) of a second antenna based on presence of the first ground member, according to an embodiment of the present disclosure.

FIG. 19 is a graph (characteristic S21) of a first antenna based on presence of the first ground member of a second antenna, according to an embodiment of the present disclosure.

Referring to FIG. 19, the first graph 1910 is a graph of the first antenna 1110 corresponding to when the first ground member 1172 of the second antenna 1160 is present, and the second graph 1920 is a graph of the first antenna 1110 corresponding to when the first ground member 1172 of the second antenna 1160 is not present.

Referring to the first graph 1910 and the second graph 1920, it can be seen that when the first ground member 1172 is not present, the values of characteristic S21 increase as a whole. Accordingly, it can be seen that the antenna characteristics corresponding to the case in which the first ground member 1172 is not present is not good as compared with the case in which the first ground member 1172 is present, and particularly, is worse at a low frequency band.

Figure 20:
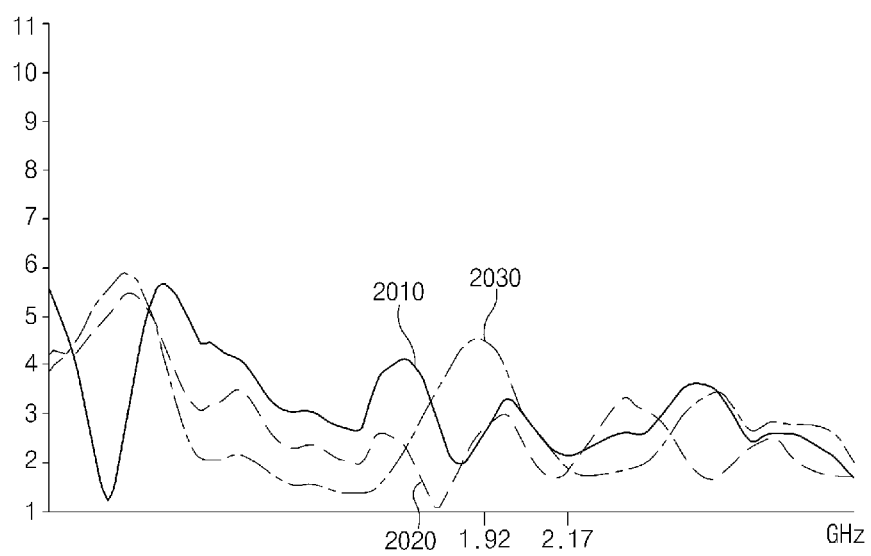
FIG. 20 is a graph (VSWR) at a middle frequency band of the first antenna based on selection of the first electrical variable element of the first antenna, according to an embodiment of the present disclosure.

FIG. 20 is a characteristic graph (VSWR) at a middle frequency band of the first antenna based on selection of the first electrical variable element of the first antenna, according an embodiment of the present disclosure.

The first graph 2010 may be a graph of the first antenna 1110 in a state in which the first device 1142 of the first electrical variable element 1140 of the first antenna 1110 is connected. The second graph 2020 may be a graph of the first antenna 1110 in a state in which the third device 1146 of the first electrical variable element 1140 of the first antenna 1110 is connected. The third graph 2030 may be a graph of the first antenna 1110 in a state in which the first electrical variable element 1140 of the first antenna 1110 is opened.

Accordingly, the first antenna 1110 may be band-switched according to which device of the first electrical variable element 1140 is connected. The communication circuit may control the first electrical variable element 1140 such that a frequency band at which the second antenna 1160 performs communication and a frequency band at which the first antenna 1110 performs communication do not overlap each other.

Figure 21:
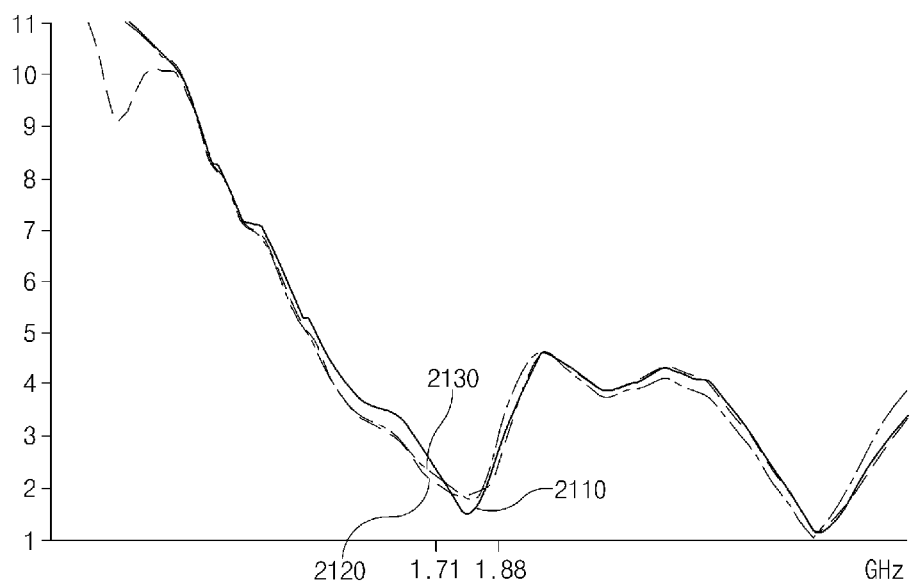
FIG. 21 is a graph (VSWR) at a middle frequency band of the second antenna based on selection of the first electrical variable element of the first antenna, according to an embodiment of the present disclosure.

FIG. 21 is a graph (VSWR) at a middle frequency band of the second antenna based on selection of the first electrical variable element of the first antenna, according to an embodiment of the present disclosure.

The first graph 2110 may be a graph of the second antenna 1160 in a state in which the third device 1146 of the first electrical variable element 1140 of the first antenna 1110 is connected. The first graph 2120 may be a graph of the second antenna 1160 in a state in which the first device 1142 of the first electrical variable element 1142 of the first antenna 1110 is connected. The third graph 2130 may be a graph of the second antenna 1160 in a state in which the first electrical variable element 1140 of the first antenna 1110 is connected. The first to third graphs 2110 to 2130 may be an antenna characteristic graph at a middle frequency band, for example, at LTE band 3.

The graph of the first antenna has been discussed based on the control of the first electrical variable element 1140 by the communication circuit. The communication circuit may control the first electrical variable element 1140 in consideration of the first antenna 1110 and the second antenna 1160 based on the control of the first electrical variable element 1140.

Figure 22:
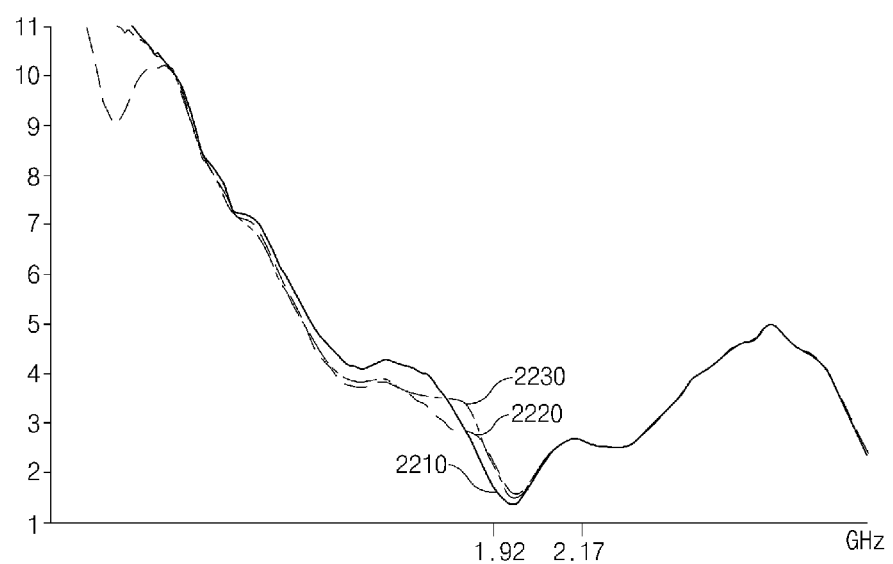
FIG. 22 is a graph (VSWR) at a middle frequency band of the second antenna based on selection of the first electrical variable element of the first antenna, according to an embodiment of the present disclosure.

FIG. 22 is a graph (VSWR) at a middle frequency band of the second antenna based on selection of the first electrical variable element of the first antenna, according to an embodiment of the present disclosure.

The first graph 2210 may be a graph of the second antenna 1160 in a state in which the third device 1146 of the first electrical variable element 1140 of the first antenna 1110 is connected. The second graph 2220 may be a graph of the second antenna 1160 in a state in which the first device 1142 of the first electrical variable element 1142 of the first antenna 1110 is connected. The third graph 2230 may be a graph of the second antenna 1160 in a state in which the first electrical variable element 1140 of the first antenna 1110 is connected. The first to third graphs 2210 to 2230 may be an antenna characteristic graph at a middle frequency band, for example, at LTE band 3.

The graph of the first antenna has been discussed based on the control of the first electrical variable element 1140 by the communication circuit. The communication circuit may control the first electrical variable element 1140 in consideration of a change in characteristics of the first antenna 1110 and the second antenna 1160 based on the control of the first electrical variable element 1140.

Figure 23:
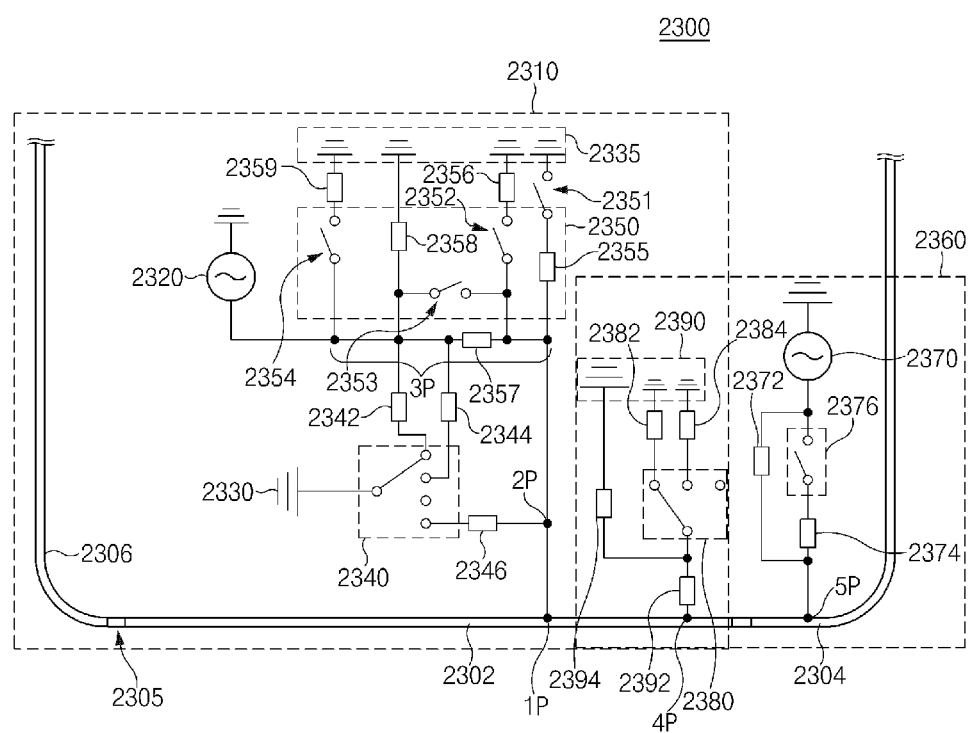
FIG. 23 is a diagram of a part of an antenna structure which uses a conductive housing of an electronic device, to which a ground member is connected, and in which feeders are connected to a metallic member and another metallic member, respectively, according to an embodiment of the present disclosure.

FIG. 23 is a diagram of an antenna structure which uses a conductive housing of an electronic device, to which a ground member is connected, and in which feeders are connected to a metallic member and another metallic member, respectively, according to an embodiment of the present disclosure.

The electronic device 2300 may include a first antenna 2310 and a second antenna 2360.

The first antenna 2310 may include at least some of a feeder 2320, a first ground member 2330, a second ground member 2335, a first electrical variable element 2340, a second electrical variable element 2350, a first metallic member 2302, a second metallic member 2304, and a third metallic member 2306.

The second antenna 2360 may include at least some of a feeder 2370, the electrical variable element 2380, a ground member 2390, the first metallic member 2302, the second metallic member 2304, and the third metallic member 2306.

The feeder 2320 of the first antenna 2310 may be connected to the first metallic member 2302 in a first electrical path through a device 2357. Accordingly, the second electrical variable element 2350 may be connected to one point of the first electrical path. The second electrical variable element 2350 may connect a first device 2355 of the second electrical variable element 2350 to the second ground member 2335 by closing a first switch 2351 of the second electrical variable element 2350, may connect a second device 2356 of the second electrical variable element 2350 to the first electrical path by closing a second switch 2352 of the second electrical variable element 2350, may virtually open the third device 2357 by closing a third switch 2353 of the second electrical variable element 2350, and may connect a fifth device 2359 of the second electrical variable element 2350 to the first electrical path by closing a fourth switch 2354 of the second electrical variable element 2350. Regardless of the first to fourth switches 2351 to 2354 of the second electrical variable element 2350, a fourth device 2358 of the second electrical variable element 2350 may be connected between the second ground member 2335 and the first electrical path.

Further, the first electrical variable element 2340 of the first antenna 2310 may be connected between the first ground member 2330 and the first electrical path. The first electrical variable element 2340 may connect any one of a first device 2342 of the first electrical variable element 2340, a second device 2344 of the first electrical variable element 2340, and a third device 2346 of the first electrical variable element 2340 to the first ground member 2330 or may not connect any one of them to the first ground member 2330.

The feeder 2370 of the second antenna 2360 may be connected to the second metallic member 2304 through a first device 2372. The first device 2372 of the feeder 2370 and a second device 2374 of the feeder 2370 may be disposed in parallel based on an operation of a switch 2376.

Further, the ground member 2390 of the second antenna 2360 may be connected to the first metallic member 2302 through a first device 2392 of the ground member 2390 of the second antenna 2360 and a second device 2394 of the ground member 2390 of the second antenna 2360. The electrical variable element 2380 of the second antenna 2360 may connect a first device 2382 of the electrical variable element 2380 or a second device 2384 of the electrical variable element 2380 to the first metallic member 2302. The electrical variable element 2380 may connect neither the first device 2382 nor the second device 2384 to the first metallic member 2302. Even in this case, the ground member 2390 may be connected to the first metallic member 2302 through the first device 2382 of the ground member 2390 and the second device 2384 of the ground member 2390.

The first antenna 2310 may be switched to a low frequency band, for example, 700 MHz, 750 MHz, 800 MHz, or 900 MHz through the first electrical variable element 2340 of the first antenna 2310 and the electrical variable element 2380 of the second antenna 2360. When the first electrical variable element 2340 connects the first device 2342 (e.g., 4.7 nH) and the electrical variable element 2380 connects the second device 2384 (e.g., 29 pF), the first antenna 2310 may be operated at a frequency band of 700 MHz. When the first electrical variable element 2340 connects the third device 2346 (e.g., 4.7 nH) and the electrical variable element 2380 connects the first device 2382 (e.g., 3.3 nH), the first antenna 2310 may be operated at a frequency band of 700 MHz. When the first electrical variable element 2340 connects the first device 2342 (e.g., 4.7 nH) and the electrical variable element 2380 connects the first device 2382 (e.g., 3.3 nH), the first antenna 2310 may be operated at a frequency band of 750 MHz. When the first electrical variable element 2340 connects the third device 2346 (e.g., 4.7 nH) and the electrical variable element 2380 is opened, the first antenna 2310 may be operated at a frequency band of 800 MHz. When the first electrical variable element 2340 connects the second 2344 (e.g., 4.7 pF) and the electrical variable element 2380 is opened, the first antenna 2310 may be operated at a frequency band of 900 MHz.

The second antenna 2360 may switch the switch 2376 of the second antenna 2310 to a high frequency band, for example, 2300 MHz and 2500 MHz. When the electrical variable element 2380 is opened and the switch 2376 is opened, the second antenna 2360 may be operated at a frequency band of 2300 MHz. The first device 2372 may be 3.3 pF. When the electrical variable element 2380 is opened and the switch 2376 is connected, the second antenna 2360 may be operated at a frequency band of 2500 MHz. The second device 2374, for example, may be 1.5 nH.

Figure 24:
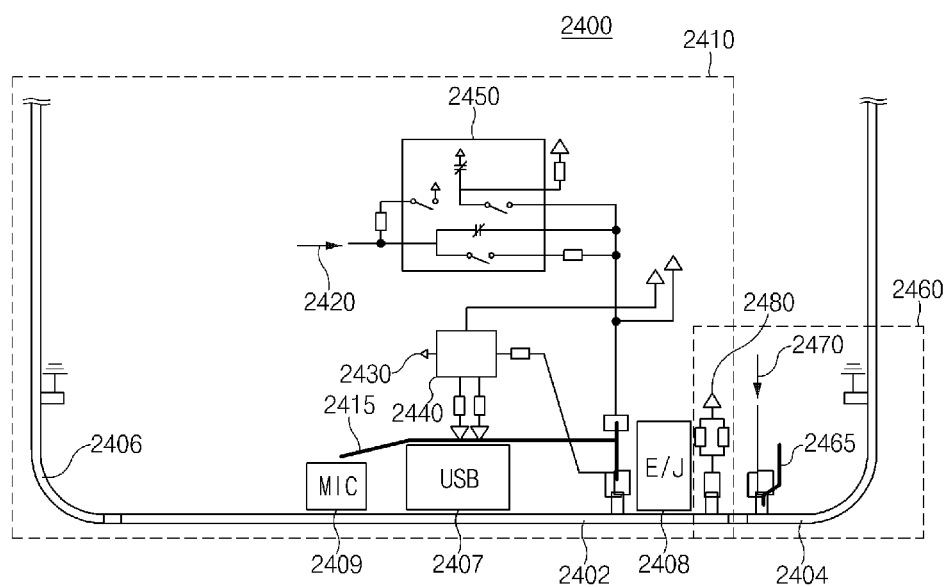
FIG. 24 is diagram of a part of an antenna structure which uses a conductive housing of an electronic device, to which a ground member is connected, and in which feeders are connected to a metallic member and another metallic member, respectively, according to an embodiment of the present disclosure.

FIG. 24 is a diagram off an antenna structure which uses a conductive housing of an electronic device, to which a ground member is connected, and in which feeders are connected to a metallic member and another metallic member, respectively, according to an embodiment of the present disclosure.

The electronic device 2400 may include a first antenna 2410 and a second antenna 2460. Further, the electronic device 2400 may include a first structure 2407 (e.g., a USB connection terminal), a second structure 2408 (e.g., an earphone connection terminal), and a third structure 2409 (e.g., a microphone).

The first antenna 2410 may include at least some of a first conductive pattern 2415, a feeder 2420, a ground member 2430, a first electrical variable element 2440, a second electrical variable element 2450, a first metallic member 2402, a second metallic member 2404, and a third metallic member 2406.

The second antenna 2460 may include at least some of a conductive pattern 2465, a feeder 2470, a ground member 2480, the first metallic member 2402, the second metallic member 2404, and the third metallic member 2406.

The first antenna 2410 at least partially corresponds to the first antenna 2310 of FIG. 23, and the second antenna 2460 at least partially corresponds to the second antenna 2360 of FIG. 23, and a repeated description thereof will be omitted.

Figure 25:
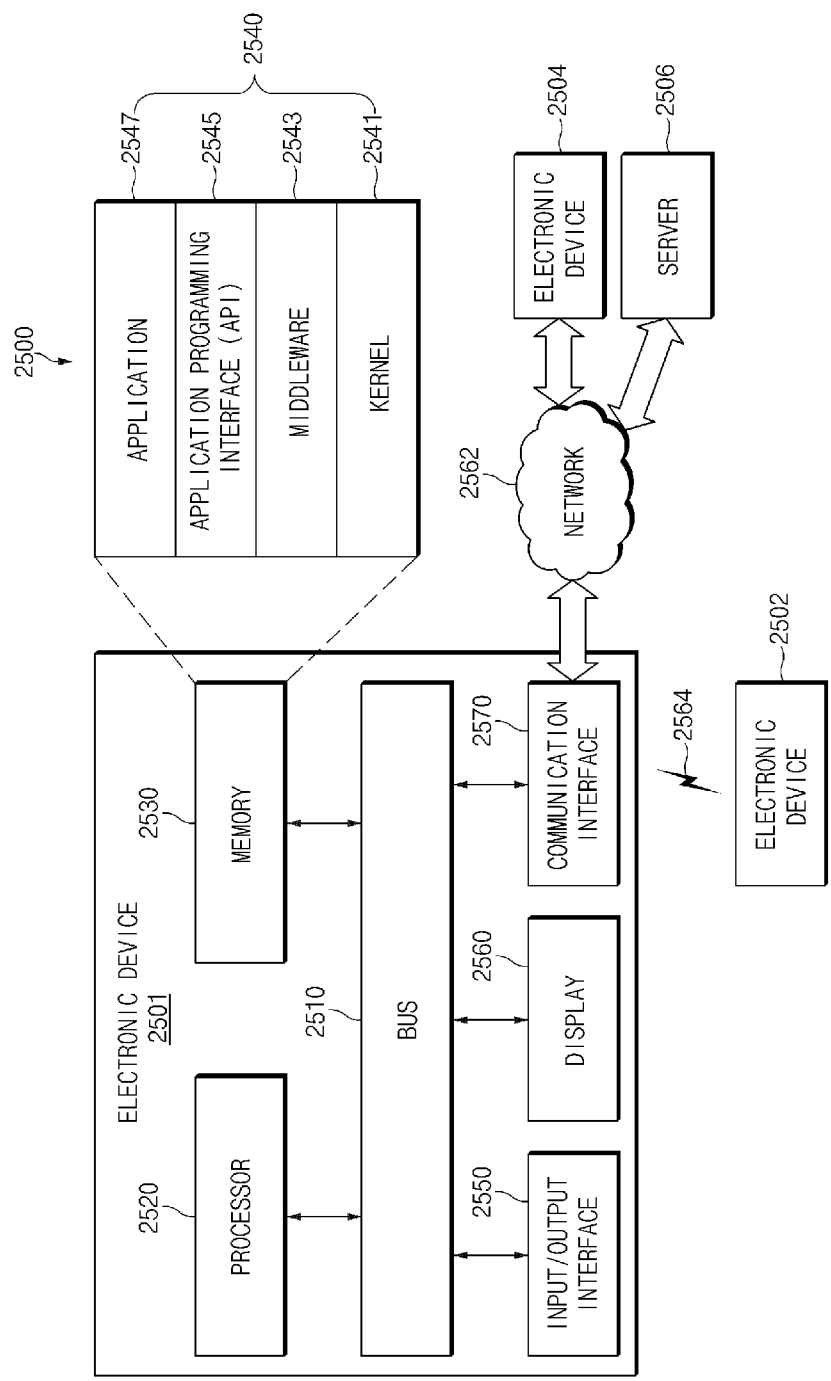
FIG. 25 is a block diagram of an electronic device, according to an embodiment of the present disclosure.

Referring to FIG. 25, there is illustrated an electronic device 2501 in a network environment 2500, according to an embodiment of the present disclosure. The electronic device 2501 includes a bus 2510, a processor 2520, a memory 2530, an input/output (I/O) interface 2550, a display 2560, and a communication interface 2570. The electronic device 2501 may not include at least one of the above-described components or may further include other component(s). The bus 2510 may interconnect the above-described elements 2510 to 2570 and may include a circuit for conveying communications (e.g., a control message or data) among the above-described elements. The processor 2520 may include one or more of a central processing unit (CPU), an application processor (AP), or a communication processor (CP). The processor 2520 may perform data processing or an operation associated with control or communication of at least one other component(s) of the electronic device 2501.

The memory 2530 may include a volatile and/or nonvolatile memory. The memory 2530 may store instructions or data associated with at least one other component(s) of the electronic device 2501. The memory 2530 may store software and/or a program 2540. The program 2540 may include a kernel 2541, a middleware 2543, an application programming interface (API) 2545, and/or an application program (or an "application") 2547. At least a part of the kernel 2541, the middleware 2543, or the API 2545 may be called an operating system (OS). The kernel 2541 may control or manage system resources (e.g., the bus 2510, the processor 2520, the memory 2530, and the like) that are used to execute operations or functions of other programs (e.g., the middleware 2543, the API 2545, and the application 2547). Furthermore, the kernel 2541 may provide an interface that allows the middleware 2543, the API 2545, or the application 2547 to access discrete elements of the electronic device 2501 so as to control or manage system resources.

The middleware 2543 may perform a mediation role such that the API 2545 or the application 2547 communicates with the kernel 2541 to exchange data. Furthermore, the middleware 2543 may process one or more task requests received from the application 2547 according to a priority. The middleware 2543 may assign the priority, which makes it possible to use a system resource (e.g., the bus 2510, the processor 2520, the memory 2530, or the like) of the electronic device 2501, to at least one of the application 2547 and may process the task requests. The API 2545 may be an interface through which the application program 2547 controls a function provided by the kernel 2541 or the middleware 2543, and may include at least one interface or function (e.g., an instruction) for a file control, a window control, image processing, a character control, or the like. The I/O interface 2550 may transmit an instruction or data, input from a user or another external device, to other element(s) of the electronic device 2501, or may output an instruction or data, input from the other element(s) of the electronic device 2501, to the user or the external device.

The display 2560 may include a liquid crystal display (LCD), a light-emitting diode (LED) display, an organic LED (OLED) display, or a microelectromechanical systems (MEMS) display, or an electronic paper display. The display 2560 may display various contents (e.g., a text, an image, a video, an icon, a symbol, and the like) to a user. The display 2560 may include a touch screen and may receive a touch, gesture, proximity, or hovering input using an electronic pen or a portion of a user's body.

The communication interface 2570 may establish communication between the electronic device 2501 and an external electronic device (e.g., a first external electronic device 2502, a second external electronic device 2504, or a server 2506). The communication interface 2570 may be connected to a network 2562 through wireless communication or wired communication to communicate with the second external electronic device 2504 or the server 2506.

The wireless communication may include a cellular communication that uses at least one of, for example, an LTE, an LTE Advance (LTE-A), a code division multiple access (CDMA), a wideband CDMA (WCDMA), a universal mobile telecommunications system (UMTS), a wireless broadband (WiBro), a global system for mobile communications (GSM), or the like. The local area network may include at least one of Wi-Fi, (BT), Bluetooth low energy (BLE), Zigbee, near field communication (NFC), magnetic secure transmission (MST), or radio frequency (RF), or body area network (BAN). A wireless communication may include a global navigation satellite system (GNSS). The GNSS may be a global positioning system (GPS), a global navigation satellite system (Glonass), a Beidou Navigation Satellite System (Beidou), or a European global satellite-based navigation system (Galileo). In this specification, "GPS" and "GNSS" may be interchangeably used.

The wired communication may include at least one of a universal serial bus (USB), a high definition multimedia interface (HDMI), a recommended standard-232 (RS-232), a power line communication, a plain old telephone service (POTS), or the like. The network 2562 may include at least one of a telecommunication network, for example, a computer network (e.g., LAN or WAN), an Internet, or a telephone network.

Each of the external first and second external electronic devices 2502 and 2504 may be a device of which the type is different from or the same as that of the electronic device 2501. All or a part of operations that the electronic device 2501 can perform may be executed by the electronic devices 2502 and 2504 or the server 2506. When the electronic device 2501 executes any function or service automatically or in response to a request, the electronic device 2501 may not perform the function or the service internally, but, alternatively additionally, it may request at least a part of a function associated with the electronic device 2501 at the electronic device 2502 or 2504 or the server 2506. The electronic device 2502 or 2504 or the server 2506 may execute the requested function or additional function and may transmit the execution result to the electronic device 2501. The electronic device 2501 may provide the requested function or service by processing the received result as it is, or additionally. To this end, cloud computing, distributed computing, or client-server computing may be used.

Figure 26:
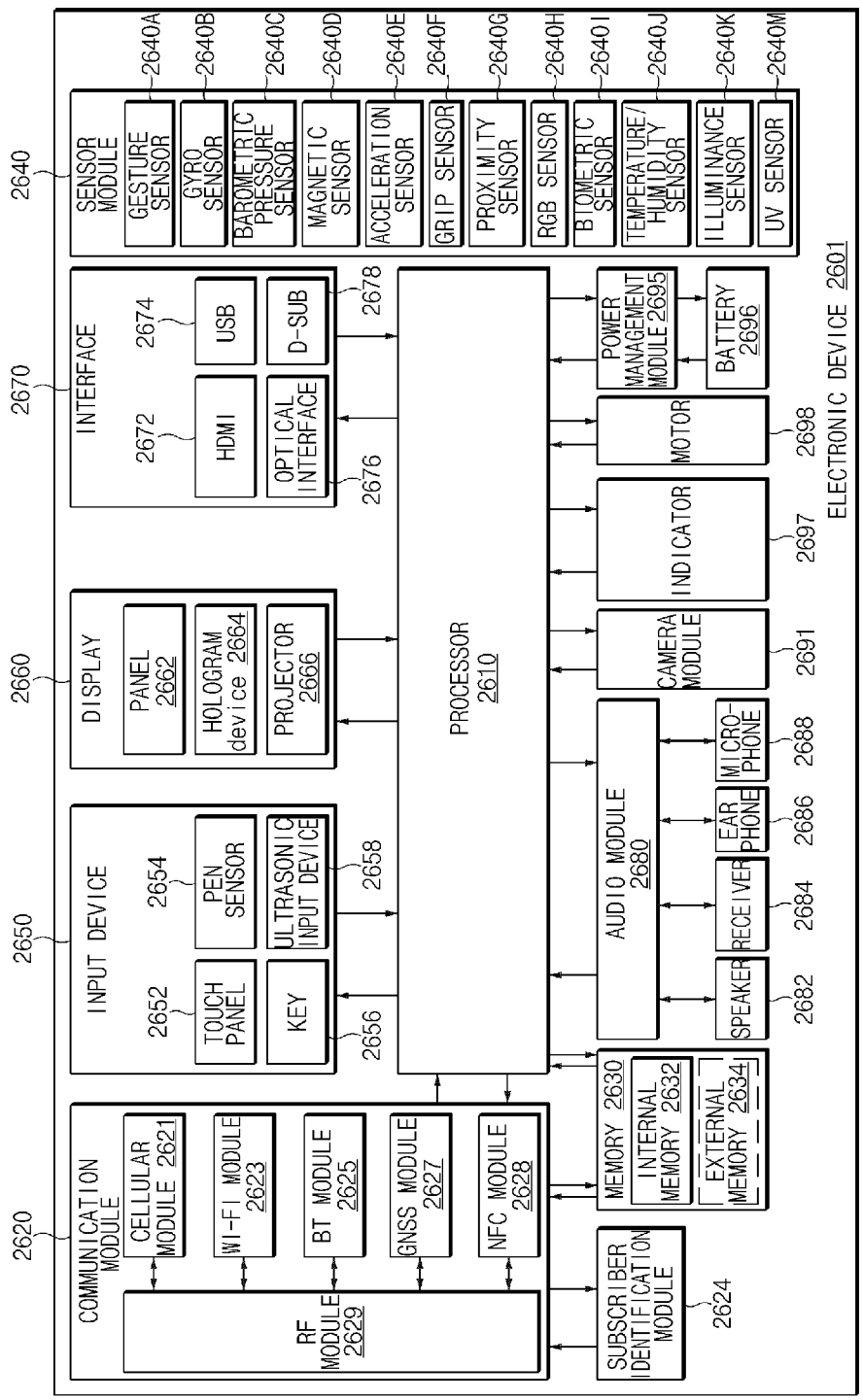
FIG. 26 is a block diagram of an electronic device, according to an embodiment of the present disclosure.

FIG. 26 is a block diagram illustrating an electronic device 2601, according to coupling of the present disclosure. The electronic device 2601 may include all or a part of an electronic device 2501 illustrated in FIG. 25. The electronic device 2601 may include one or more processors (e.g., an application processor (AP)) 2610, a communication module 2620, a subscriber identification module (SIM) 2624, a memory 2630, a sensor module 2640, an input device 2650, a display 2660, an interface 2670, an audio module 2680, a camera module 2691, a power management module 2695, a battery 2696, an indicator 2697, and a motor 2698.

The processor 2610 may drive an OS or an application program to control a plurality of hardware or software elements connected to the processor 2610 and may process and compute a variety of data. The processor 2610 may be implemented with a system on chip (SoC). The processor 2610 may further include a graphic processing unit (GPU) and/or an image signal processor. The processor 2610 may include at least a part (e.g., a cellular module 2621) of elements illustrated in FIG. 25. The processor 2610 may load and process an instruction or data, which is received from at least one of other elements (e.g., a nonvolatile memory) and may store result data in a nonvolatile memory.

The communication module 2620 may be configured the same as or similar to a communication interface 2570. For example, the communication module 2620 may include the cellular module 2621, a Wi-Fi module 2623, a BT module 2625, a GNSS module 2627, a NFC module 2628, and a radio frequency (RF) module 2629. The cellular module 2621 may provide voice communication, video communication, a character service, an Internet service, or the like through a communication network. The cellular module 2621 may perform discrimination and authentication of the electronic device 2601 within a communication network using a SIM 2624 (e.g., a SIM card). The cellular module 2621 may perform at least a portion of functions that the processor 2610 provides. The cellular module 2621 may include a CP. At least a part (e.g., two or more elements) of the cellular module 2621, the Wi-Fi module 2623, the BT module 2625, the GNSS module 2627, or the NFC module 2628 may be included within one integrated circuit (IC) or an IC package. The RF module 2629 may transmit and receive, a communication signal (e.g., an RF signal). The RF module 2629 may include a transceiver, a power amplifier module (PAM), a frequency filter, a low noise amplifier (LNA), an antenna, or the like. At least one of the cellular module 2621, the Wi-Fi module 2623, the BT module 2625, the GNSS module 2627, or the NFC module 2628 may transmit and receive an RF signal through a separate RF module.

The SIM 2624 may be an embedded SIM and may include unique identification information (e.g., integrated circuit card identifier (ICCID)) or subscriber information (e.g., integrated mobile subscriber identity (IMSI)).

The memory 2630 may include an internal memory 2632 or an external memory 2634. For example, the internal memory 2632 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 2634 may include a flash drive such as compact flash (CF), secure digital (SD), micro secure digital (Micro-SD), mini secure digital (Mini-SD), extreme digital (xD), a multimedia card (MMC), a memory stick, or the like. The external memory 2634 may be functionally or physically connected with the electronic device 2601 through various interfaces.

The sensor module 2640 may measure a physical quantity or may detect an operating state of the electronic device 2601. The sensor module 2640 may convert the measured or detected information to an electric signal. The sensor module 2640 may include at least one of a gesture sensor 2640A, a gyro sensor 2640B, a pressure sensor 2640C, a magnetic sensor 2640D, an acceleration sensor 2640E, a grip sensor 2640F, a proximity sensor 2640G, a color sensor 2640H (e.g., a red, green, blue (RGB) sensor), a living body sensor 2640I, a temperature/humidity sensor 2640J, an illuminance sensor 2640K, or an ultra violet (UV) sensor 2640M. Although not illustrated, additionally or generally, the sensor module 2640 may further include an e-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 2640 may further include a control circuit that controls at least one or more sensors included therein. The electronic device 2601 may further include a processor which is a part of the processor 2610 or independent of the processor 2610 and is configured to control the sensor module 2640. The processor may control the sensor module 2640 while the processor 2610 remains at a sleep state.

The input device 2650 may include a touch panel 2652, a (digital) pen sensor 2654, a key 2656, or an ultrasonic input device 2658. The touch panel 2652 may use at least one of capacitive, resistive, infrared and ultrasonic detecting methods. Also, the touch panel 2652 may further include a control circuit. The touch panel 2652 may further include a tactile layer to provide a tactile reaction to a user. The (digital) pen sensor 2654 may be a part of a touch panel or may include an additional sheet for recognition. The key 2656 may include a physical button, an optical key, a keypad, and the like. The ultrasonic input device 2658 may detect (or sense) an ultrasonic signal, which is generated from an input device, through a microphone 2688 and may verify data corresponding to the detected ultrasonic signal.

The display 2660 may include a panel 2662, a hologram device 2664, a projector 2666, and/or a control circuit that circuits the panel 2662, the hologram device 2664, and the projector 2666. The panel 2662 may be implemented to be flexible, transparent or wearable, for example. The panel 2662 and the touch panel 2652 may be integrated into one or more modules. The panel 2662 may include a pressure sensor (or a "force sensor") that is capable of measuring the intensity of pressure on the touch of the user. The pressure sensor may be integrated with the touch panel 2652 or may be implemented with one or more sensors that are independent of the touch panel 2652. The hologram device 2664 may display a stereoscopic image in a space using a light interference phenomenon. The projector 2666 may project light onto a screen so as to display an image. The screen may be arranged inside or outside the electronic device 2601. The interface 2670 may include an HDMI 2672, a USB 2674, an optical interface 2676, or a d-subminiature (D-sub) 2678. The interface 2670 may be included in the communication interface 2570 illustrated in FIG. 25. Additionally or alternatively, the interface 2670 may include a mobile high definition link (MHL) interface, a secure digital (SD) card/ multi-media card (MMC) interface, or an infrared data association (IrDA) standard interface.

The audio module 2680 may convert a sound and an electric signal in dual directions. At least a part of the audio module 2680 may be included in the I/O interface 2550 illustrated in FIG. 25. The audio module 2680 may process sound information that is input or output through a speaker 2682, a receiver 2684, an earphone 2686, or the microphone 2688.

The camera module 2691 for shooting a still image or a video may include at least one image sensor (e.g., a front sensor or a rear sensor), a lens, an image signal processor (ISP), or a flash (e.g., an LED or a xenon lamp).

The power management module 2695 may manage power of the electronic device 2601. The power management module 2695 may include a power management integrated circuit (PMIC), a charger IC, or a battery gauge. The PMIC may have a wired charging method and/or a wireless charging method. The wireless charging method may include a magnetic resonance method, a magnetic induction method, or an electromagnetic method and may further include an additional circuit, for example, a coil loop, a resonant circuit, a rectifier, or the like.

The battery gauge may measure a remaining capacity of the battery 2696 and a voltage, current or temperature thereof while the battery is charged. The battery 2696 may include a rechargeable battery and/or a solar battery.

The indicator 2697 may display a specific state of the electronic device 2601 or a part thereof (e.g., the processor 2610), such as a booting state, a message state, a charging state, and the like. The motor 2698 may convert an electrical signal into a mechanical vibration and may generate the following effects: vibration, haptic, and the like. For example, the electronic device 2601 may include a mobile TV supporting device that processes media data according to the standards of digital multimedia broadcasting (DMB), digital video broadcasting (DVB), Mediaflo™, or the like.

Each of the above-mentioned elements of the electronic device 2601 may be configured with one or more elements, and the names of the elements may be changed according to the type of the electronic device. The electronic device 2601 may exclude some elements or may further include other additional elements. Alternatively, some of the elements of the electronic device 2601 may be combined with each other so as to form one entity, so that the functions of the elements may be performed in the same manner as before the combination.

Figure 27:
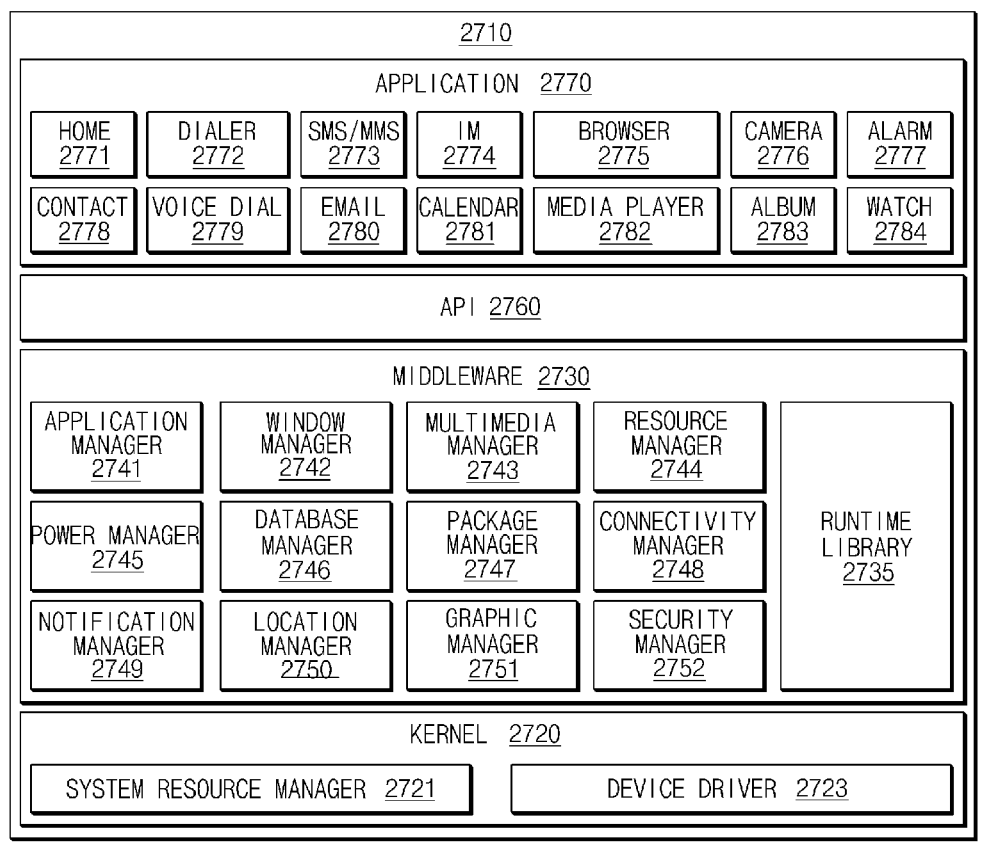
FIG. 27 is a block diagram of a program module, according to an embodiment of the present disclosure.

FIG. 27 is a block diagram of a program module, according to an embodiment of the present disclosure. A program module 2710 may include an OS to control resources associated with an electronic device (e.g., the electronic device 2501), and/or diverse applications (e.g., the application 2547) driven on the OS. The OS may include, for example, Android™, iOS™, Windows™, Symbian™, Tizen™, or Bada™.

Referring to FIG. 27, the program module 2710 may include a kernel 2720, a middleware 2730, an API 2760, and/or an application 2770. At least a part of the program module 2710 may be preloaded on an electronic device or may be downloadable from an external electronic device (e.g., the electronic device 2502 or 104, the server 2506, or the like).

The kernel 2720 may include a system resource manager 2721 and/or a device driver 2723. The system resource manager 2721 may perform control, allocation, or retrieval of system resources. The system resource manager 2721 may include a process managing part, a memory managing part, or a file system managing part. The device driver 2723 may include a display driver, a camera driver, a BT driver, a common memory driver, an USB driver, a keypad driver, a Wi-Fi driver, an audio driver, or an inter-process communication (IPC) driver.

The middleware 2730 may provide a function which the application 2770 needs in common or may provide diverse functions to the application 2770 through the API 2760 to allow the application 2770 to use limited system resources of the electronic device. The middleware 2730 may include at least one of a runtime library 2735, an application manager 2741, a window manager 2742, a multimedia manager 2743, a resource manager 2744, a power manager 2745, a database manager 2746, a package manager 2747, a connectivity manager 2748, a notification manager 2749, a location manager 2750, a graphic manager 2751, or a security manager 2752.

The runtime library 2735 may include a library module, which is used by a compiler, to add a new function through a programming language while the application 2770 is being executed. The runtime library 2735 may perform input/ output management, memory management, or processing of arithmetic functions. The application manager 2741 may manage the life cycle of the application 2770. The window manager 2742 may manage a graphical user interface (GUI) resource which is used in a screen.

The multimedia manager 2743 may identify a format necessary to play media files, and may perform encoding or decoding of media files by using a codec suitable for the format. The resource manager 2744 may manage source code of the application 2770 or a space of a memory. The power manager 2745 may manage the capacity of a battery or power and may provide power information that is needed to operate an electronic device. The power manager 1045 may operate in conjunction with a basic input/output system (BIOS). For example, the database manager 2746 may generate, search for, or modify database which is to be used in the application 2770. The package manager 2747 may install or update an application which is distributed in the form of a package file.

The connectivity manager 2748 may manage a wireless connection. The notification manager 2749 may provide a user with an event such as an arrival message, an appointment, or a proximity notification.

The location manager 2750 may manage location information of an electronic device. The graphic manager 2751 may manage a graphic effect to be provided to a user or a user interface relevant thereto. The security manager 2752 may provide system security or user authentication. The middleware 2730 may include a telephony manager, which manages a voice or video call function of the electronic device, or a middleware module that combines functions of the above-described elements. The middleware 2730 may provide a module specialized to each OS kind. The middleware 2730 may remove a part of the preexisting elements, dynamically, or may add new elements thereto.

The API 2760 may be a set of programming functions and may be provided with another configuration which is variable depending on an OS. For example, in the case where an OS is Android™ or iOS™, it may be permissible to provide one API set per platform. In the case where an OS is Tizen™, it may be permissible to provide two or more API sets per platform.

The application 2770 may include, for example, a home application 2771, a dialer application 2772, an SMS/MMS application 2773, an instant message (IM) application 2774, a browser application 2775, a camera application 2776, an alarm application 2777, a contact application 2778, a voice dial application 2779, an e-mail application 2780, a calendar application 2781, a media player application 2782, an album application 2783, a watch application 2784, a health care application (e.g., measuring an exercise quantity, blood sugar, or the like), or an application for offering environment information (e.g., atmospheric pressure, humidity, or temperature).

The application 2770 may include an information exchanging application that supports information exchange between an electronic device and an external electronic device. The information exchanging application may include a notification relay application for transmitting specific information to the external electronic device, or a device management application for managing the external electronic device. The notification relay application may send notification information, which is generated from other applications of an electronic device, to an external electronic device or may receive the notification information from the external electronic device and may provide a user with the notification information. The device management application may install, delete, or update a function (e.g., turn-on/turn-off of an external electronic device itself (or a part of components) or adjustment of brightness (or resolution) of a display) of the external electronic device, which communicates with an electronic device, or an application running in the external electronic device. The application 2770 may include an application (e.g., a health care application of a mobile medical device) that is assigned in accordance with an attribute of the external electronic device. The application 2770 may include an application received from an external electronic device. At least a part of the program module 2710 may be implemented (e.g., performed) by software, firmware, hardware (e.g., the processor 2610), or a combination of two or more thereof, and may include modules, programs, routines, sets of instructions, or processes for performing one or more functions.

Figure 28A:
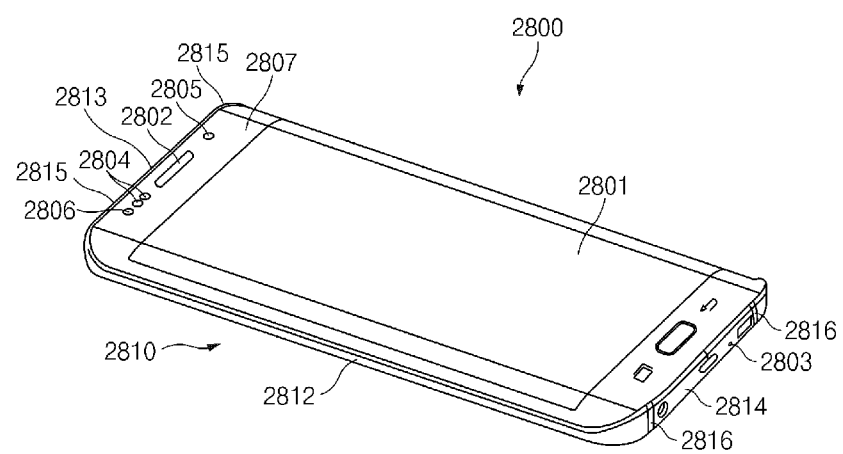
FIG. 28A is a front perspective view of an electronic device, according to an embodiment of the present disclosure.

FIG. 28A is a front perspective view of an electronic device 2800, according to an embodiment of the present disclosure.

Referring to FIG. 28A, a display 2801 may be installed on a front surface 2807 of the electronic device 2800. A speaker unit 2802 for receiving voice of a counterpart may be installed above the display 2801. A microphone unit 2803 for transmitting voice of the user of the electronic device to a counterpart may be installed below the display 2801.

Components for performing various functions of the electronic device 2800 may be arranged near the speaker unit 2802. The components may include one or more sensor modules 2804. The sensor module 2804 may include at least one of a luminance sensor (e.g., an optical sensor), a proximity sensor, an infrared ray sensor, and an ultrasonic wave sensor. The components may include a camera unit 2805. The components may include an indicator 2806 to inform the user of state information of the electronic device 2800.

The electronic device 2800 may include a metal bezel 2810 (for example, may BE at least a portion of a metal housing). The metal bezel 2810 may be arranged along a periphery of the electronic device 2800 and may be arranged to extend to at least a portion of the rear surface of the electronic device 2800, which extends to the periphery of the electronic device 2800. The metal bezel 2810 may define the thickness of the electronic device along the periphery of the electronic device 2800, and may be formed in the form of a loop. The metal bezel 2810 may be formed in a manner that contributes to at least a portion of the thickness of the electronic device 2800. The metal bezel 2810 may be arranged only in at a portion of the periphery of the electronic device 2800. The metal bezel 2810 includes one or more segmenting parts 2813 and 2814, and unit metal parts 2815 and 2816 separated by the segmenting parts 2813 and 2814 may be utilized as antenna radiation bodies according to exemplary embodiments of the present disclosure.

Figure 28B:
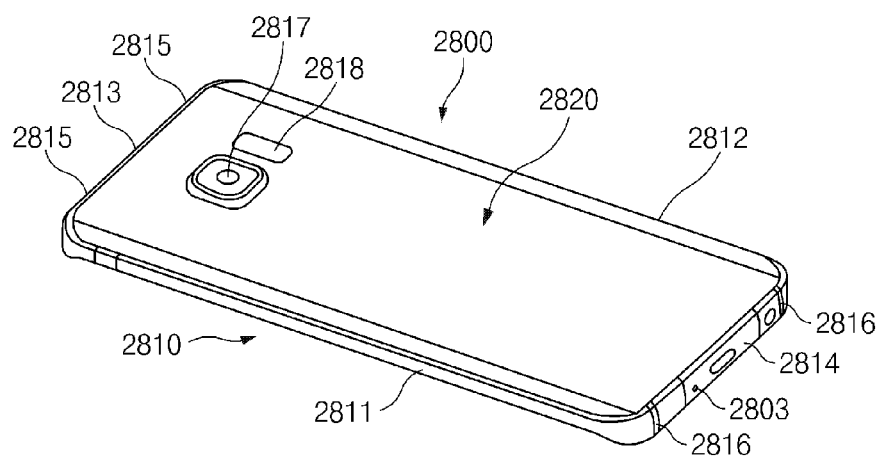
FIG. 28B is a rear perspective view of an electronic device, according to an embodiment of the present disclosure.

FIG. 28B is a rear perspective view of an electronic device, according to an embodiment of the present disclosure.

Referring to FIG. 28B, a cover member 2820 may be further installed on the rear surface of the electronic device 2800. The cover member 2820 may be a battery cover that protects a battery pack detachably installed in the electronic device 2800 and making the external appearance of the electronic device 2800 appealing. The cover member 2820 may be integrally formed with the electronic device 2800 to contribute as a rear housing of the electronic device. The cover member 2820 may be formed of various materials such as a metal, glass, a composite material, or a synthetic resin. A camera unit 2817 and a flash 2818 may be arranged on the rear surface of the electronic device 2800.

A lower bezel part 2814 of the metal bezel 2810 arranged to surround a periphery of the electronic device 2800, which is used as a unit bezel, may be utilized as one antenna radiator of a complex antenna. The lower bezel part 2814 may be arranged such that another antenna radiator arranged in the vicinity of the antenna may be coupled.

The metal bezel 2810 may have a loop shape along the periphery of the electronic device 2800 and may be arranged in a manner that contributes to the entire thickness or a portion of the thickness of the electronic device 2800. When the electronic device 2800 is viewed from the front side, the metal bezel 2810 may have a right bezel part 2811, a left bezel part 2812, an upper bezel part 2813, and a lower bezel part 2814. Here, the above-described upper and lower bezel parts 2813 and 2814 may contribute as unit metal parts formed by the segmenting parts 2815 and 2816.

Figure 28C:
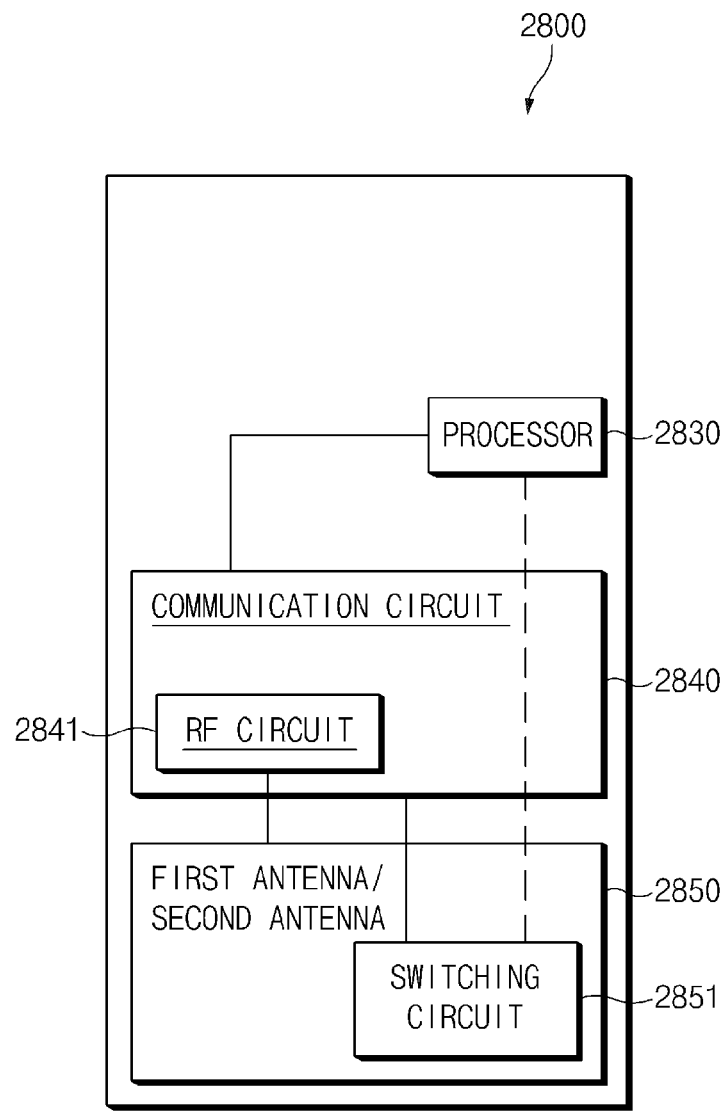
FIG. 28C is a block diagram illustrating a configuration of an electronic device for controlling an operation band of an antenna, according to an embodiment of the present disclosure.

FIG. 28C is a block diagram illustrating a configuration of an electronic device for controlling an operation band of an antenna, according to an embodiment of the present disclosure.

Referring to FIG. 28C, the electronic device 2800 may include a processor 2830, a communication module/circuit 2840 controlled by the processor 2830, and an antenna 2850 controlled by the processor 2830 or the communication module/circuit 2840.

The communication module/circuit 2840 may have the same or similar structure to the communication interface 2570 of FIG. 25. The communication module/circuit 2840 may include a cellular module, a Wi-Fi module, a BT module, a GNSS module (e.g., a GPS module, a Glonass module, a Beidou module, or a Galileo module), an NFC module, and an RF module.

The RF module/circuit 2841 may transmit/receive a communication signal (e.g., an RF signal). The RF module/circuit 2841 may include a transceiver, a PAM, a frequency filter, a LNA, or an antenna.

The antenna 2850 may include at least two antenna radiators. The antenna 2850 may include a conductive member used as a part of the electronic device 2800 and is electrically connected to the RF module/circuit 2841 to be operated as a first antenna radiator. The antenna 2850 may include a conductive member disposed in the interior of the electronic device 2800 and electrically connected to the RF module/circuit 2841 to be operated as a second antenna radiator. The antenna 2850 may include a switching circuit 2851 branched from an electrical path electrically connecting the communication module/circuit 2840 and the conductive member and electrically connected to the ground member.

The antenna 2850 may change the operational frequency bands of a conductive member operated as a first antenna radiator and/or a conductive pattern operated as a second antenna radiator or expand the bandwidth of the antenna 2850 according to a switching operation of the switching circuit 2851 operated under the control of the communication module/circuit 2840 or the processor 2830.

An electronic device may include a housing including a first metallic member, a second metallic member, and a nonconductive segmenting part located between an end of the first metallic member and an end of the second metallic member, at least one ground member, at least one wireless communication circuit, wherein the at least one wireless communication circuit is connected to a first point of the first metallic member through a first electrical path and is connected to a second point of the first metallic member through a second electrical path, and the second point is closer to the end of the first metallic member than the first point, a first conductive pattern located inside of the housing and electrically connected to the first electrical path, a second conductive pattern located inside of the housing and electrically connected to the second electrical path, a first electrical variable element electrically connected between the first electrical path and the at least one ground member, and a second electrical variable element electrically connected between one point of the second metallic member and the at least one ground member.

The first electrical variable element may include a first switch and a first plurality of electrically different components.

The second electrical variable element may include a second switch and a second plurality of electrically different components.

The housing may include a first surface facing a first direction, a second surface facing a second direction opposite to the first surface, and a side surface surrounding at least a portion of a space between the first surface and the second surface, and the first metallic member, the second metallic member, and the nonconductive segmenting part may define at least a portion of the side surface.

The at least one wireless communication circuit may transmit and/or receive a first signal in a frequency range of 600 MHz to 5.9 GHz.

The at least one wireless communication circuit may transmit and/or receive a second signal in a frequency range of 600 MHz to 1000 MHz.

The at least one wireless communication circuit may transmit and/or receive a third signal in a frequency range of 1500 MHz to 2300 MHz.

The wireless communication circuit may transmit and/or receive a fourth signal in a frequency range of 2300 MHz to 5.9 GHz.

The electronic device may further include a third electrical variable element electrically connected between the first electrical path and the at least one ground member.

The third electrical variable element may be a tuner chip including a plurality of switches and a plurality of devices.

The first conductive pattern and the second conductive pattern may be connected to the first electrical path and the second electrical path through coupling members, respectively.

The first conductive pattern and the second conductive pattern may be located in a nonconductive bracket included in the housing through laser direct structuring (LDS).

The first conductive pattern may be located via one surface of the bracket and another surface of the bracket, which is opposite to the one surface of the bracket.

The second conductive pattern may be located on one surface of the bracket.

The bracket may be stacked on a printed circuit board (PCB) included in the housing, and the at least one ground member, the at least one wireless communication circuit, the coupling members, the first electrical variable elements, and the second electrical variable element may be mounted on the printed circuit board.

The at least one wireless communication circuit may control switches included in the first electrical variable element, the second electrical variable element, and the third electrical variable element, respectively.

The first electrical path may be connected to the first metallic member through a coupling member mounted on the printed circuit board at a location corresponding to an end of the first electrical path.

The coupling member may include a first coupling member located on one surface of the printed circuit board and a second coupling member located on an opposite surface of the printed circuit board, and the first coupling member and the second coupling member may be connected to each other through a via hole.

An electronic device may include a housing including a first elongated conductive part including a first end, a second elongated conductive part including a second end in the vicinity of the first end, and a nonconductive part inserted between the first end and the second end, at least one ground member, at least one wireless communication circuit electrically connected to a first point of the first elongated conductive part through a first electrical path and to a second point of the first elongated conductive part through a second electrical path, wherein the second point is closer to the first end than the first point, a first conductive pattern disposed inside of the housing and electrically connected to the first electrical path, a second conductive pattern disposed inside of the housing and electrically connected to the second electrical path, a first electrical variable element electrically connected between the first electrical path and the at least one ground member, and a second electrical variable element electrically connected between one point of the second elongated conductive part and the at least one ground member.

The first electrical variable element may include a first switch and a first plurality of electrically different components.

The second electrical variable element may include a second switch and a second plurality of electrically different components.

The housing may include a first surface facing a first direction, a second surface facing a second direction opposite to the first direction, and a side surface surrounding at least a portion of a space between the first surface and the second surface, and the first elongated conductive part, the second elongated conductive part, and the nonconductive part define at least a portion of the side surface.

The wireless communication circuit may transmit and/or receive a first signal in a frequency range of 600 MHz to 5.9 GHz.

The wireless communication circuit may transmit and/or receive a second signal in a frequency range of 600 MHz to 1000 MHz.

The wireless communication circuit may transmit and/or receive a third signal in a frequency range of 1500 MHz to 2300 MHz.

The wireless communication circuit may transmit and/or receive a fourth signal in a frequency range of 2300 MHz to 5.9 GHz.

At least a part of an apparatus (e.g., modules or functions thereof) or a method (e.g., operations) may be implemented by instructions stored in a computer-readable storage media (e.g., the memory 2530) in the form of a program module. The instruction, when executed by a processor (e.g., a processor 2520), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The instruction may include codes created by a compiler or codes that are capable of being executed by a computer by using an interpreter. A module or a program module may include at least one of the above elements, or a part of the above elements may be omitted, or other elements may be further included. Operations executed by modules, program modules, or other elements may be executed by a successive method, a parallel method, a repeated method, or a heuristic method, or at least one part of operations may be executed in different sequences or omitted. Alternatively, other operations may be added.

The feeders of the first antenna and the second antenna of the electronic devices described herein are connected to one metallic member (housing) between the nonconductive segmenting parts and the electrical variable elements that frequency-tune the first antenna and the second antenna, thereby providing efficient communication performance of the first antenna and the second antenna when compared to antenna configurations of conventional electronic device. Additionally, communication performance may be enhanced by reducing interference between the first antenna and the second antenna of the electronic device at a necessary frequency band by using an electrical variable element.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
    a housing including a first metallic member, a second metallic member, and a nonconductive segmenting part located between an end of the first metallic member and an end of the second metallic member;
    a ground member;
    a wireless communication circuit connected to a first point of the first metallic member through a first electrical path and connected to a second point of the first metallic member through a second electrical path;
    a first conductive pattern electrically connected to the first electrical path;
    a second conductive pattern electrically connected to the second electrical path;
    a first electrical variable element electrically connected between the first electrical path and the ground member; and
    a second electrical variable element electrically connected between the second metallic member and the ground member.

2. The electronic device of claim 1, wherein the first electrical variable element includes a first switch and a first plurality of electrically different components.

3. The electronic device of claim 1, wherein the second electrical variable element includes a second switch and a second plurality of electrically different components.

4. The electronic device of claim 1, wherein the housing includes a first surface facing a first direction, a second surface facing a second direction opposite to the first surface, and a side surface surrounding a portion of a space between the first surface and the second surface, and
    wherein the first metallic member, the second metallic member, and the nonconductive segmenting part define a portion of the side surface.

5. The electronic device of claim 1, wherein the wireless communication circuit transmits and/or receives a first signal in a frequency range of 600 MHz to 5.9 GHz.

6. The electronic device of claim 1, wherein the wireless communication circuit transmits and/or receives a second signal in a frequency range of 600 MHz to 1000 MHz.

7. The electronic device of claim 1, wherein the wireless communication circuit transmits and/or receives a third signal in a frequency range of 1500 MHz to 2300 MHz.

8. The electronic device of claim 1, wherein the wireless communication circuit transmits and/or receives a fourth signal in a frequency range of 2300 MHz to 5.9 GHz.

9. The electronic device of claim 1, further comprising:
    a third electrical variable element electrically connected between the first electrical path and the ground member.

10. The electronic device of claim 9, wherein the third electrical variable element is a tuner chip including a plurality of switches and a plurality of devices.

11. The electronic device of claim 1, wherein the first conductive pattern and the second conductive pattern are connected to the first electrical path and the second electrical path through respective coupling members.

12. The electronic device of claim 11, wherein the first conductive pattern and the second conductive pattern are located in a nonconductive bracket included in the housing through laser direct structuring (LDS).

13. The electronic device of claim 12, wherein the first conductive pattern is located on a first surface of the bracket and a second surface of the bracket, which is opposite to the first surface of the bracket.

14. The electronic device of claim 12, wherein the second conductive pattern is located on a first surface of the bracket.

15. The electronic device of claim 12, wherein the bracket is stacked on a printed circuit board (PCB) included in the housing, and
    wherein the ground member, the wireless communication circuit, the coupling members, the first electrical variable elements, and the second electrical variable element are mounted on the printed circuit board.

16. The electronic device of claim 9, wherein the wireless communication circuit controls switches included in the first electrical variable element, the second electrical variable element, and the third electrical variable element.

17. The electronic device of claim 9, wherein the first electrical path is connected to the first metallic member through a coupling member mounted on the printed circuit board at a location corresponding to an end of the first electrical path.

18. The electronic device of claim 17, wherein the coupling member includes a first coupling member located on a first surface of the printed circuit board and a second coupling member located on a second surface, which is opposite the first surface, of the printed circuit board, and
wherein the first coupling member and the second coupling member are connected to each other through a hole.

19. An electronic device comprising:
a housing including a first conductive part including a first end, a second conductive part including a second end proximate to the first end, and a nonconductive part inserted between the first end and the second end;
a ground member;
a wireless communication circuit electrically connected to a first point of the first conductive part through a first electrical path and to a second point of the first conductive part through a second electrical path;
a first conductive pattern electrically connected to the first electrical path;
a second conductive pattern electrically connected to the second electrical path;
a first electrical variable element electrically connected between the first electrical path and the ground member; and
a second electrical variable element electrically connected between the second conductive part and the ground member.

20. The electronic device of claim 19, wherein the housing includes a first surface facing a first direction, a second surface facing a second direction opposite to the first direction, and a side surface surrounding at least a portion of a space between the first surface and the second surface, and the first conductive part, the second conductive part, and the nonconductive part define at least a portion of the side surface.

* * * * *